(12) United States Patent
Arazaki

(10) Patent No.: US 7,537,303 B2
(45) Date of Patent: May 26, 2009

(54) PRINTING DEVICE, PROGRAM FOR CONTROLLING PRINTING DEVICE, METHOD OF CONTROLLING PRINTING DEVICE, PRINTING DATA CREATING DEVICE, PROGRAM FOR CONTROLLING PRINTING DATA AND METHOD OF CREATING PRINTING DATA

(75) Inventor: Shinichi Arazaki, Shimosuwa (JP)

(73) Assignee: Seiko Epson Corporation (JP)

( * ) Notice: Subject to any disclaimer, the term of this patent is extended or adjusted under 35 U.S.C. 154(b) by 296 days.

(21) Appl. No.: 11/350,385

(22) Filed: Feb. 8, 2006

(65) Prior Publication Data

US 2006/0181565 A1 Aug. 17, 2006

(30) Foreign Application Priority Data

| Feb. 14, 2005 | (JP) | ............................. 2005-035641 |
| Oct. 28, 2005 | (JP) | ............................. 2005-315155 |

(51) Int. Cl.
*B41J 29/393* (2006.01)
(52) U.S. Cl. .......................................... 347/19; 347/15
(58) Field of Classification Search ................... 347/42
See application file for complete search history.

(56) References Cited

U.S. PATENT DOCUMENTS

| 5,581,284 | A | 12/1996 | Hermanson |
| 6,283,571 | B1 | 9/2001 | Zhou et al. |
| 6,293,643 | B1 | 9/2001 | Shimada et al. |
| 6,328,404 | B1 | 12/2001 | Fujimori |
| 6,908,176 | B2 | 6/2005 | Koitabashi et al. |
| 6,953,238 | B2 | 10/2005 | Koitabashi et al. |
| 7,334,859 | B2 * | 2/2008 | Kojima .......................... 347/19 |
| 2003/0085939 | A1 | 5/2003 | Koitabashi et al. |

FOREIGN PATENT DOCUMENTS

| EP | 1 308 279 A2 | 11/2002 |
| EP | 2002-331694 | 11/2002 |
| EP | 1 332 882 A1 | 1/2003 |
| JP | 01-235655 | 9/1989 |
| JP | 05-030361 | 2/1993 |
| JP | 11-151821 | 8/1999 |
| JP | 11-254662 | 9/1999 |
| JP | 2000-79710 | 3/2000 |

(Continued)

*Primary Examiner*—Matthew Luu
*Assistant Examiner*—Justin Seo
(74) *Attorney, Agent, or Firm*—Harness, Dickey & Pierce, P.L.C.

(57) ABSTRACT

A printing device includes a unit acquiring first image data having pixel data corresponding to a pixel value of an M value corresponding to each color of the color image; a unit storing nozzle information related to banding; a unit creating second image data by changing a pixel data value corresponding to an abnormal nozzle in the first image data; a unit creating printing data by converting the second image data into dot forming pattern data; and a unit that prints a color image constructed by the second image data. The second image data creating unit changes a pixel data value corresponding to the abnormal nozzle into a value for reducing the banding, and thereafter, changes a pixel data value of a different color nozzle so the predetermined color is within the same color range, in an image portion of the predetermined color.

11 Claims, 16 Drawing Sheets

FOREIGN PATENT DOCUMENTS

| | | |
|---|---|---|
| JP | 2000-190470 | 7/2000 |
| JP | 2000-225716 | 8/2000 |
| JP | 2002-019101 | 1/2002 |
| JP | 2003-063043 | 3/2003 |
| JP | 2003-136702 | 5/2003 |
| JP | 2003-205604 | 7/2003 |

* cited by examiner

IDEAL ARRANGEMENT

IMAGE AFFECTED BY FLYING CURVE

IMAGE RESOLUTION IS REDUCED
TO HALF AN ORIGINAL IMAGE RESOLUTION
DUE TO FLYING CURVE NOZZLE
CAUSING FLYING CURVE IS NOT USED

IMAGE CONCENTRATION IS LOWERED
DUE TO FLYING CURVE

FIG. 10A CYAN NOZZLE GROUP

| NOZZLE NUMBER | RELATIVE FLYING CURVE AMOUNT (RELATIVE EJECTION PRECISION) [μm] (FLYING CURVE AMOUNT FROM IDEAL POSITION OF NOZZLE NUMBER N + 1 − FLYING CURVE AMOUNT FROM IDEAL POSITION OF NOZZLE NUMBER N) |
|---|---|
| 1 | −1 |
| 2 | −3 |
| 3 | +1 |
| . | |
| . | |
| . | |
| 1438 | +4 |
| 1439 | +3 |
| 1440 | − |

FIG. 10B MAGENTA NOZZLE GROUP

| NOZZLE NUMBER | EJECTION EXISTENCE AND NONEXISTENCE INFORMATION |
|---|---|
| 1 | 0 |
| 2 | 0 |
| 3 | 1 |
| . | |
| . | |
| . | |
| 1438 | 0 |
| 1439 | 1 |
| 1440 | 0 |

0: NORMAL EJECTION  1: NON-EJECTION (CLOGGING)

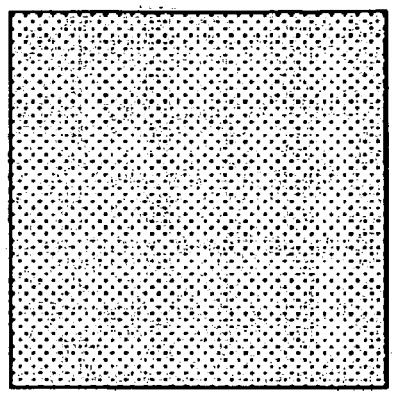
FIG.11A
C=50%
M=90%
Y=20%
K=10%
≠
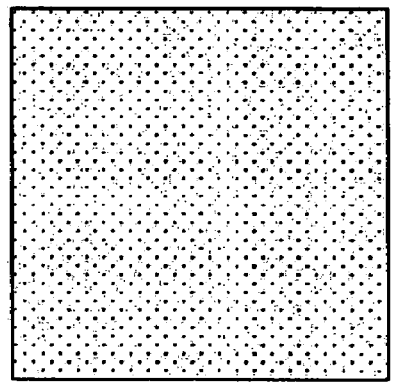
FIG.11B
C=30%
M=70%
Y= 0%
K=30%
| CORRESPONDING COLOR | C | M | Y | K |
|---|---|---|---|---|
| MIXTURE ALLOWABLE RATIO | 30% | 30% | 60% | 20% |
FIG.12

| | CONCENTRATION RATIO OF CYAN (PRINTED RATIO) | CONCENTRATION RATIO OF LIGHT CYAN | PRINTED RATIO OF LIGHT CYAN | TOTAL VALUE OF CYAN CONCENTRATION |
|---|---|---|---|---|
| ALLOCATION OF EACH INK COLOR AT THE TIME OF CONVERTING COLOR | 75 | | | 75 |
| AFTER DIVIDING COLOR WITHIN RANGE OF THE SAME COLOR | 30 | 45 | 90 | 75 |
| CHANGE BANDING PREVENTING RATIO (LIGHT CYAN) | 55 | 20 | 40 | 75 |
| INK COMBINATION BY RELATIONSHIP WITH OTHER COLOR | 45 | 20 | 40 | 65 |

FIG.17

PRINTING DEVICE, PROGRAM FOR CONTROLLING PRINTING DEVICE, METHOD OF CONTROLLING PRINTING DEVICE, PRINTING DATA CREATING DEVICE, PROGRAM FOR CONTROLLING PRINTING DATA AND METHOD OF CREATING PRINTING DATA

RELATED APPLICATIONS

This application claims priority to Japanese Patent Application Nos. 2005-035641 filed Feb. 14, 2005 and 2005-315155 filed Oct. 28, 2005 which are hereby expressly incorporated by reference herein in their entirety.

BACKGROUND

1. Technical Field

The present invention relates to a printing device used for a facsimile device, a copy machine, or an office automation (OA) device, a program for controlling a printing device, and a method of controlling a printing device. More particularly, the present invention relates to a printing device suitable for a so-called inkjet type printing process for ejecting a plurality of minute color particles of liquid ink onto printing paper (recording material) so as to form a predetermined character or image, a program for controlling a printing device, a method of controlling a printing device, a printing data creating device, a program for creating printing data, and a method of creating printing data.

2. Related Art

Hereinafter, a printing device, particularly, an inkjet type printer (hereinafter, referred to as 'inkjet printer') will be described.

Generally, since an inkjet printer is advantageous in that it is available at a low cost and a color printing material having a high quality can be easily obtained, it has been widely used for office and personal use as personal computers and digital cameras have become popular.

This inkjet printer generally has the following structure. A movable body called a carriage, in which an ink cartridge and a printing head are integrally formed, ejects minute particles of liquid ink in a dot shape through nozzles of the printing head on a printing medium (paper) while reciprocally moving on the recording medium in a direction vertical to a paper transporting direction, and a predetermined character or image is formed on the printing medium so as to create a desired printing material (an ink cartridge and a printing head may be separated from each other and ink may be supplied to the printing head through a tube or the like). In addition, the carriage includes ink cartridges of four colors (black, yellow, magenta, and cyan) including black and printing heads for the respective four colors, so that not only black-and-white printing but also full color printing combining the respective colors are easily performed (In addition, ink cartridges of six colors including the above-mentioned four colors, light cyan, and light magenta or seven colors or eight colors has been practically used).

As such, in the inkjet printer in which the printing is performed while reciprocally moving the printing head of the carriage on the recording medium in a direction vertical to a paper transporting direction, the printing head needs to perform a reciprocal motion several tens of times or several hundreds of times or more so as to clearly perform printing corresponding to one page. Therefore, it takes a lot of time for the inkjet printer to perform printing, as compared with another type of printing device, for example, a laser printer using an electrophotographic technology of a copy machine or the like.

In the meantime, in an inkjet printer in which a printing head having a length which is the same size (or larger) as a width of the printing paper is provided and a carriage is not used, since it is not necessary for the printing head to move in a width direction of the printing paper and the printing can be done through a so-called one scanning (one pass) process, high speed printing can be performed, similar to the laser printer. In addition, since it is not required to provide the carriage with the printing heads mounted thereon and a driving system moving it, a printer case can become smaller and lighter, and unwanted noise can be further reduced. The inkjet printer of the former is generally called a 'multipass-type printer' or a 'serial printer', and the inkjet printer of the latter is generally called a 'line-head-type printer'.

In the printing head necessary for the inkjet printer, minute nozzles each having a diameter within a very small range of 10 to 70 μm are disposed in one row or a plurality of rows in a printing direction at predetermined intervals. As a result, an ink ejection direction of some nozzles may be inclined or the nozzle position may deviate from an ideal position due to manufacturing error, so that a landing position of some dots formed by the nozzles may deviate from an ideal position, thereby causing a so-called 'flying curve phenomenon' to occur. In addition, nozzles having a large variation, in which each nozzle may extremely increase or decrease an ink amount as compared with an ideal ink amount, may exist due to the variation characteristics of the nozzle.

As a result, a printing failure called a 'banding (stripe) phenomenon' may occur in a portion printed by using the defective nozzles, so that a printing quality may be lowered. Specifically, if the 'flying curve' phenomenon occurs, the distance between dots ejected by adjacent nozzles does not become uniform. As such, 'white stripes' (in a case in which the printing paper is white) occur in a portion where the distance between adjacent dots is larger than the normal (desired) distance, and 'thick stripes' occur in a portion where the distance between adjacent dots is smaller than the normal distance. In addition, in a case in which an ink amount is different from an ideal ink amount, thick stripes occur in dots formed by the nozzles ejecting a large amount of ink, and white stripes occur in dots formed by the nozzles ejecting a small amount of ink.

Specifically, it is likely for the banding phenomenon to occur more in 'a line-head-type printer' where the printing head or the printing medium is fixed (one pass printing) than in 'the multipass-type printer' (serial printer) (in the multipass-type printer, there is a technology in which the printing head performs a reciprocal motion many times to prevent the banding from occurring).

For this reason, in order to prevent the printing failure caused by 'the banding phenomenon', research and development have been performed in respect to the hardware, such as improving a manufacturing technology or design of the printing head. However, it is not yet possible to provide a perfect printing head capable of preventing the 'banding phenomenon' due to limitations imposed by manufacturing costs and current technology.

Accordingly, in addition to the improvement in the hardware, a technology, which reduces the banding phenomenon by using printing control, that is, a software-like method, which will be described in detail below, has been used.

For example, in JP-A-2002-19101 or JP-A-2003-136702, which will be described below, in order to resolve problems of the nozzle variation or non-ejection of the ink, the problem of the head variation is resolved by using a shading correction technology in a portion having the low printing concentration, and the problem of the banding or variation is resolved by using another color (for example, when being printed with black, cyan or magenta is used) in a portion that has the high printing concentration.

Further, in JP-A-2003-63043, which will be described below, a method has been suggested in which for a solid image (that is, a base is covered such that the base is not seen), an ink ejection amount of each nozzle adjacent to the non-ejection nozzle is increased and a solid image is formed using all of nozzles.

Furthermore, in JP-A-05-30361, a method is used in which a variation amount of each nozzle is fed back to an error spreader, so that the variation of the ink ejection amount of the nozzle is absorbed, thereby preventing a banding phenomenon from occurring.

However, according to the method of reducing the banding phenomenon or variation by using another color as in JP-A-2002-19101 or JP-A-2003-136702, since the color of the processed portion may be changed, it is not suitable for printing that requires high definition and high quality, as in color transfer image printing.

In addition, when a method of preventing 'a white stripe phenomenon' by distributing information of the non-ejection nozzle to the left and right sides with respect to a portion where the concentration is high is applied to the above-mentioned 'flying curve phenomenon', the white stripe can be reduced, but the banding may remain in the portion where the concentration is high.

In a method disclosed in JP-A-2003-63043, if the printing material is a solid image, the problem does not occur, but if the printing material is a printing material of a halftone, this method cannot be used. In addition, if the method of burying thin lines using another color is infrequently used, the problem does not occur. However, in an image in which another color is continuously generated, the color of the part of the image may be changed, similarly to the above-mentioned case.

Furthermore, in the method disclosed in JP-A-05-30361, with respect to the problem that the contents formed by the dots vary, the proper feedback process is complicated, and it is difficult to resolve it.

SUMMARY

An advantage of some aspects of the invention is that it provides a printing device capable of resolving or reducing deterioration of image quality caused by a banding phenomenon occurring due to a flying curve phenomenon and resolving or reducing deterioration of an image quality caused by an ejection failure of ink, a program for controlling a printing device, a method of controlling a printing device, a printing data creating device, a program for creating printing data, and a method of controlling printing data.

According to a first aspect of the invention, there is provided a printing device which prints a color image to be printed on a printing medium by a printing head. The printing head has a plurality of nozzles corresponding to a plurality of colors of ink for forming a dot on the printing medium. The printing device includes an image data acquiring unit that acquires first image data having a plurality of pixel data corresponding to a pixel value of an M value (M≧2) corresponding to each color of the color image; a nozzle information storing unit that stores nozzle information capable of identifying a nozzle related to banding among the plurality of nozzles; a second image data creating unit that creates second image data by changing a pixel value of pixel data corresponding to an abnormal nozzle related to the banding in the first image data based on the nozzle information; a printing data creating unit that creates printing data by converting the second image data into dot forming pattern data corresponding to each color of a color image so as to form the color image constructed by the second image data on the recording medium; and a printing unit that prints the color image constructed by the second image data on the recording medium by the printing head based on the printing data. The second image data creating unit changes a pixel value of pixel data corresponding to the abnormal nozzle into a value capable of preventing or reducing the banding, and after changing the pixel value, changes a pixel value of pixel data corresponding to a nozzle of a color different from the color of the ink ejected by the abnormal nozzle related to the printing of an image portion of a predetermined color such that the predetermined color is within the same color range, with respect to the image portion of the predetermined color printed by nozzles corresponding to a plurality of colors including the abnormal nozzle in the color image configured by the first image data.

According to this aspect, the image data acquiring unit can acquire first image data having a plurality of pixel data corresponding to a pixel value of an M value (M≧2) corresponding to each color of the color image, the nozzle information storing unit can store nozzle information capable of identifying a nozzle related to banding among the plurality of nozzles, the second image data creating unit can create second image data by changing a pixel value of pixel data corresponding to an abnormal nozzle related to the banding in the first image data based on the nozzle information, the printing data creating unit can create printing data by converting the second image data into dot forming pattern data corresponding to each color of a color image so as to form the color image constructed by the second image data on the printing medium, and a printing unit can print the color image constructed by the second image data on the printing medium by the printing head based on the printing data.

In addition, the second image data creating unit changes a pixel value of pixel data corresponding to the abnormal nozzle into a value capable of preventing or reducing the banding, and after changing the pixel value, changes a pixel value of pixel data corresponding to a nozzle of a color different from the color of the ink ejected by the abnormal nozzle related to the printing of an image portion of a predetermined color such that the predetermined color is within the same color range, with respect to the image portion of the predetermined color printed by nozzles corresponding to a plurality of colors including the abnormal nozzle in the color image configured by the first image data.

Accordingly, the ink ejection amount of the nozzle, which forms the image portion of the predetermined color and which is related to the banding, is changed such that the banding does not occur, for example, the ink ejection amount is reduced, the reduced ink ejection amount is compensated by increasing the ink ejection amount of the color different from the color corresponding to the abnormal nozzle, and the pixel value of the image portion of the predetermined color can be reconstructed such that the predetermined color is within a range of the same color. Therefore, it is possible to obtain a printed result in which the banding does not occur or the banding is barely visible. In addition, in addition to maintaining the color information before the change, the ink ejection amount of only the nozzle related to the banding (abnormal nozzle) is changed. As a result, it is possible to reproduce the image of the image data on the printing medium having a high image quality without affecting the image.

In this case, the dot refers to one region formed by landing the ink ejected from one or a plurality of nozzles on the recording medium. In addition, the area of 'the dot' is not zero, the dot has a predetermined size (area), and a plurality of different kinds of dots exists for every size. However, the dot formed by ejecting the ink is not necessarily a circular shape. When the dot is formed to have an elliptical shape other than a circular shape, the average diameter may be handled as the dot diameter or by assuming an equivalent dot of a circular shape having the same area as an area of the dot formed by ejecting any amount of ink, the diameter of the equivalent diameter may be handled as the dot diameter. In addition, as a method of selectively impacting the dot having the different concentration, for example, a method of impacting each dot having the same dot size and the different concentration, a method of impacting each dot having the same concentration and the different dot size, and a method of differentiating the concentration of each dot having the same concentration and the different ink ejection amount by the overlapping impacting may be considered. In addition, in a case in which one ink drop ejected from one nozzle is divided into small ink drops and then lands, it is assumed as one dot. However, in a case in which dots of two or more sequentially formed from two nozzles or one nozzle are coupled with each other, it is assumed that two dots are formed. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, the image data acquiring unit acquires the image data inputted from an optical printing result reading unit such as a scanner or actively or passively acquires the image data stored in the external device through a network such as a LAN or a WAN, or acquires the image data from the recording medium such as a CD-ROM, a DVD-ROM or the like through a driving device such as a CD drive, a DVD drive or the like included in the printing device, or acquires the image data stored in the storage device included in the printing device. That is, the acquiring of the image data includes input, obtainment, reception or reading. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the nozzle information storing unit' stores the nozzle information in all of the storing units at all times. In addition, it may store the nozzle information in advance and may store the nozzle information through the input from the external device at the time of operating the printing device without storing the nozzle information in advance. For example, before the printing device is manufactured and is then sold as the product at the time of a shipment in a factory, by an optical printing result reading unit such as a scanner or the like, the variation amount of the dot forming position of each of the nozzles constituting the printing head or the ink ejection state is tested from the printing result by the printing head and the test result is stored in advance. Alternatively, at the time of using the printing device, in the same manner as the time of shipment in the factory, the variation amount of the dot forming position of each of nozzles constituting the printing head is tested, and the test result is stored. As such, the nozzle information can be stored at any time of using the product. In addition, after the printing device is used, in order to cope with the case in which the characteristic of the printing head is changed, the deviation amount of the position printed by the printing head or the ink ejection state of each nozzle is tested from the printing result through the printing head by using the optical printing result reading unit such as the scanner or the like, and the tested result and the data at the time of a shipment in the factory are stored or the tested result is overwritten on the data at the time of a shipment in the factor so as to be updated (Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below).

In addition, the 'banding' refers to a printing failure in which 'white stripes' and 'thick stripes' simultaneously occur in the printing result because of a so-called 'flying curve phenomenon' caused by the nozzle whose dot forming position deviates from the ideal dot forming position, and a printing failure in which 'white stripes' and 'thick stripes' simultaneously occur in the printing result because of an ink ejection failure such as the case in which the ink is not ejected from the nozzle and the case where the ink ejection amount of the nozzle is larger or smaller than the normal ink ejection amount. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the flying curve phenomenon' is different from the simple ink non-ejection phenomenon of some of nozzles, which has been described above. Specifically, it refers to a phenomenon that the ink is ejected, but the ink ejection direction of some of nozzles is inclined and the position of the dot deviates from the ideal position. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the white stripe' refers to a portion (region) where the phenomenon that the distance between adjacent dots becomes larger than the predetermined distance by 'the flying curve phenomenon' continuously occurs and the color of the base of the printing medium is seen in a stripe shape. In addition, 'the thick stripe' refers to a portion (region) where the phenomenon that the distance between adjacent dots becomes smaller than the predetermined distance by 'the flying curve phenomenon' continuously occurs and the color of the base of the printing medium is not seen or where the distance between the dots becomes smaller than the predetermined distance and the color of the base of the printing medium is relatively thickly seen or where a part of the dots formed so as to be deviated from the normal position overlaps the normal dot and the overlapping portion is seen in a thick stripe shape. In addition, the white stripe may occur due to the nozzle having a small ink ejection amount and the thick stripe may occur due to the nozzle having a large ink ejection amount. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, the 'nozzle related to the banding (abnormal nozzle)' refers to at least one of the nozzles in which the dot forming position thereof deviates from the ideal dot forming position to cause 'the flying curve phenomenon' to occur (or nozzles in which the ink ejection amount thereof is not suitable) and the nozzle adjacent to the abnormal nozzle. When 'the white stripe' occurs, it may include the nozzle whose dot forming position deviates from the normal dot forming position due to 'the flying curve phenomenon' and the nozzle forming the normal dots where the distance is larger than the normal distance with respect to the deviated dot. In addition, when 'the thick stripe' occurs, it may include the nozzle whose dot forming position deviates from the normal dot forming position due to 'the flying curve phenomenon' and the nozzle forming the normal dots where the distance is smaller than the normal distance with respect to the deviated dot and the part or all of the dots overlap. In addition, the range of the neighborhood is not limited to the above-mentioned example, but it may be increased to three nozzles adjacent to the corresponding nozzle at both sides. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, the 'pixel data corresponding to the abnormal nozzle' refers to the pixel data corresponding to the dots formed by the abnormal nozzle or pixel data corresponding to the dots formed by the abnormal nozzle and the peripheral nozzles of the abnormal nozzle. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, the 'printing data' refers to data created by subjecting the multiple-valued image data (for example, M value ($M \geq 3$)) to an N-value conversion process ($M > N \geq 2$) using an error spread method in accordance with the kind of the dot forming size by the nozzle, and includes information, such as information about the dot existence or non-existence with respect to each pixel value of the image data for each color (indicating where the dot is formed or not by the nozzle) and information about the dot forming size (for example, any one of three kinds of large, middle, and small), which are necessary for forming the dot by the nozzle. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the range of the same color' refers to a range including a corresponding predetermined color and the color which can be recognized as the predetermined color even if it is not the predetermined color.

Preferably, the second image data creating unit changes a pixel value of pixel data corresponding to the abnormal nozzle into a value where the ink ejection amount of the abnormal nozzle becomes smaller than the ink ejection amount before the change, changes a pixel value of pixel data corresponding to a nozzle of another color different from the color of the ink ejected by the abnormal nozzle related to the printing of the image portion of the predetermined color into a value compensating for the reduced ink ejection amount of the nozzle of another color from the ink ejection amount before the change in the abnormal nozzle, and creates second image data in which the predetermined color is within a range of the same color.

According to this aspect, by reducing the ink ejection amount of the color related to the banding, the banding does not occur in the printing result or the banding is not seen in the printing result. In addition, since the color variation of the predetermined color by the reduced ink amount can be compensated with another color, it is possible to suppress the color variation of the predetermined color within the range of the same color.

Preferably, the range of the same color is a range in which the color difference $\Delta E$ between an image portion before changing the pixel value and an image portion after changing the pixel value satisfies the condition $0 \leq \Delta E \leq 0.7$ in a Lab color space.

According to this aspect, the color variation of the predetermined color can be reliably suppressed within the range of the color capable of being recognized as the same color visually.

In this case, the 'Lab color space' is a color space recommended by a CIE (Commission Internationale d'Eclairage=International Commission on Illumination) in 1976, and it is based on an XYZ colorimetric system and is called an L * a * b * calorimetric system. The L * a * b * colorimetric system is a representative type of a so-called UCS (Uniform Color Space), and it is translated with a 'uniform color space' in Japanese. That is, the uniform color space refers to any color space where the distance between the same colors (a psychological sense of distance) is uniform psychologically (that is, when seeing the color). Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

Preferably, another color different from the color of the ink ejected by the abnormal nozzle is a color of another system different from a system of the color of the ink ejected by the abnormal nozzle.

According to this aspect, the ink ejection amount of another color of a system different from a system of the color related to the banding is changed, so that the balance of the color is changed. For example, since the reduced ink ejection amount of the color related to the banding can be compensated, the reduced ink ejection amount can be compensated with the minimum amount of change of the color without causing the color to be changed.

In this case, 'the color of another system' refers to the color different from the color of the ink ejected by the abnormal nozzle. Specifically, among cyan, magenta, yellow, black, blue, red, and green, the respective colors have color systems different from one another. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

Preferably, another color different from the color of the ink ejected by the abnormal nozzle is a color of the same system as the color of the ink ejected by the abnormal nozzle.

According to this aspect, when the nozzle corresponding to the ink of the color having high saturation is related to the banding, since the reduced ink ejection amount of the color corresponding to the corresponding nozzle can be compensated by changing the ink ejection amount of the similar color of the same system having low saturation, the influence of the color of another system can be suppressed, and the banding can be prevented from occurring or reduced while suppressing the problem of the color variation at the minimum.

In this case, 'the similar color of the same system' refers to the color of the ink whose color is the same as the corresponding color and whose concentration (saturation) is different from the corresponding color. For example, each of cyan and light cyan, magenta and light magenta, and black and gray becomes the similar color of the same system. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

Preferably, another color different from the color of the ink ejected by the abnormal nozzle includes a color of another system different from a system of the color of the ink ejected by the abnormal nozzle and a color of the same system as the color of the ink ejected by the abnormal nozzle.

According to this aspect, in accordance with the color of the ink corresponding to the nozzle related to the banding, the ink ejection amount of each of the similar color of the same system as the corresponding color and the color of another system different from the system of the corresponding color is changed so as to change the color balance, so that the reduced ink amount of the color related to the banding can be compensated. In a state in which the color variation is suppressed at the minimum and the influence of another color is suppressed at the minimum, the banding can be prevented from occurring or reduced. In addition, the preferable change method can be selected for each region becoming the process subject, and it is possible to cope with more regions.

Preferably, the second image data creating unit determines a changed value of a pixel value corresponding to the abnormal nozzle based on a color corresponding to the abnormal nozzle.

According to this aspect, with respect to the color, such as yellow, having the relatively high luminosity, even though a large amount of ink is ejected, the banding is not seen, but with respect to the color, such as cyan or magenta, having relatively low luminosity, even though only a relatively small amount of ink is ejected as compared with the color having the relatively high luminosity, the banding may be easily seen. Accordingly, the changed amount of the ink ejection amount is determined (controlled) in accordance with the luminosity of the color related to the banding, so that the banding can be prevented or reduced with the minimal changed amount.

Preferably, the printing data creating unit creates printing data in which a dot is not formed for a part or all of pixel data with respect to the pixel data having a pixel value among the pixel data corresponding to the nozzle related to the banding in the second image data, whose ink ejection amount is not more than a predetermined amount.

According to this aspect, generally, with respect to the color of which the ink ejection amount can be reduced to a quarter of the ejection limit amount or less, even if the resolution of the corresponding portion is reduced to half the original resolution, the same effect can be achieved. Therefore, when the ink ejection amount of the nozzle related to the banding can be reduced to a quarter of the ejection limit amount or less, the printing data in which the corresponding nozzle is not used with respect to the part of the corresponding pixel data (the dots are not formed) is created, so that the banding can be prevented or reduced without causing the image quality to be deteriorated.

In a case in which there is a nozzle which ejects the ink of the similar color to the ink of the color corresponding to the nozzle related to the banding, the nozzle related to the corresponding banding is not used with respect to all of the corresponding pixel data, and the nozzle having been not used can be compensated by the nozzle corresponding to the similar color. Thereby, the desired color can be reproduced without causing the problem such as the color variation to be generated, so that the banding can be prevented or reduced.

In this case, the 'ink ejection amount' refers to an amount indicating to the extent the dot is formed with respect to the predetermined area of the printing medium. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the predetermined amount or less' refers to the ink amount (the number of the dots) that when setting a maximum dot forming number to 100%, the number of the dots formed on the predetermined area of the printing medium becomes a quarter (25%) or less of the maximum forming dot number or half (50%) or less of the maximum forming dot number. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, the 'printing data which does not form the dots' refers to the printing data in which all of the dots formed by the abnormal nozzle are not used (not formed) with respect to a part or all of the pixel data. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

Preferably, in the printing head, the nozzles are continuously arranged over a range larger than a region where the printing medium is mounted, and the printing head can perform printing through one scanning operation.

According to this aspect, as described above, since 'the white stripe' or 'the thick stripe' caused by the banding, which can easily occur when the line-head-type printing head in which the printing is completed with so-called one pass is used, cannot be seen, it is possible to effectively create the printing data.

Preferably, the printing head performs printing while performing a reciprocal motion in a direction orthogonal to a paper transporting direction of the printing medium.

The above-mentioned banding is remarkably seen in the case of the line-head-type printing head, but it may occur in the case of the multipass-type printing head. Accordingly, if the above-mentioned printing method is applied to the multipass-type printing head, 'the white stripe' or 'the thick stripe' caused by the banding occurring in the multipass-type printing head cannot be seen, so that it is possible to effectively the printing data.

In addition, in the case of the multipass-type printing head, the scanning operation is repeatedly performed through the printing head, so that the banding can be prevented from occurring or reduced. However, if the above-mentioned printing device is applied, since the scanning operation does not need to be performed many times through the printing head at the same position, it is possible to achieve the high-speed printing.

According to a second aspect of the invention, there is a program for controlling a printing device which prints a color image to be printed on a printing medium by a printing head, the printing head having a plurality of nozzles corresponding to a plurality of colors of ink for forming a dot on the printing medium. The program is used for a computer to execute a process. The process includes: acquiring first image data having a plurality of pixel data corresponding to a pixel value of an M value (M≧2) corresponding to each color of the color image; creating second image data by changing a pixel value of pixel data corresponding to an abnormal nozzle related to the banding in the first image data based on nozzle information capable of identifying a nozzle related to banding among the plurality of nozzles; creating printing data by converting the second image data into dot forming pattern data corresponding to each color of a color image so as to form the color image constructed by the second image data on the printing medium; and printing the color image constructed by the second image data on the printing medium by the printing head based on the printing data. During the creating of the second image data, a pixel value of pixel data corresponding to the abnormal nozzle is changed into a value capable of preventing or reducing the banding, and after changing the pixel value, a pixel value of pixel data corresponding to a nozzle of a color different from the color of the ink ejected by the abnormal nozzle related to the printing of an image portion of a predetermined color is changed such that the predetermined color is within the same color range, with respect to the image portion of the predetermined color printed by nozzles corresponding to a plurality of colors including the abnormal nozzle in the color image configured by the first image data.

According to this aspect, if the computer reads out the program and then executes the process in accordance with the read program, it is possible to achieve the same effects as the first aspect of the invention.

In addition, all of the printing devices, such as the inkjet printer or the like, which are on the market, includes a computer system composed of a central processing unit (CPU), storing units (RAM and ROM), and an input/output unit. In addition, since the respective units can be implemented through software by the computer system, it may be chiefly and easily achieved, as compared with the case in which the respective units are implemented by creating the exclusive hardware.

In addition, updated versions may be easily made by the function change or improvement through the change of the portion of the program.

Preferably, during the creating of the second image data, a pixel value of pixel data corresponding to the abnormal nozzle is changed into a value where the ink ejection amount of the abnormal nozzle becomes smaller than the ink ejection amount before the change, a pixel value of pixel data corresponding to a nozzle of another color different from the color of the ink ejected by the abnormal nozzle related to the printing of the image portion of the predetermined color is changed into a value compensating for the reduced ink ejection amount of the nozzle of another color from the ink ejection amount before the change in the abnormal nozzle, and second image data is created in which the predetermined color is within a range of the same color.

According to this aspect, if the computer reads out the program and then executes the process in accordance with the read program, it is possible to achieve the same effects as the first aspect of the invention.

Preferably, the range of the same color is a range in which the color difference $\Delta E$ between an image portion before changing the pixel value and an image portion after changing the pixel value satisfies the condition ($0 \leq \Delta E \leq 0.7$) in a Lab color space.

According to this aspect, if the computer reads out the program and executes the process in accordance with the read program, it is possible to achieve the same effects as the first aspect of the invention.

Preferably, another color different from the color of the ink ejected by the abnormal nozzle is a color of another system different from a system of the color of the ink ejected by the abnormal nozzle.

According to this aspect, if the computer reads out the program and executes the process in accordance with the read program, it is possible to achieve the same effects as the first aspect of the invention.

Preferably, another color different from the color of the ink ejected by the abnormal nozzle is a color of the same system as the color of the ink ejected by the abnormal nozzle.

According to this aspect, if the computer reads out the program and executes the process in accordance with the read program, it is possible to achieve the same effects as the first aspect of the invention.

Preferably, another color different from the color of the ink ejected by the abnormal nozzle includes a color of another system different from a system of the color of the ink ejected by the abnormal nozzle and a color of the same system as the color of the ink ejected by the abnormal nozzle.

According to this aspect, if the computer reads out the program and executes the process in accordance with the read program, it is possible to achieve the same effects as the first aspect of the invention.

Preferably, in the creating of the second image data, a changed value of a pixel value corresponding to the abnormal nozzle is determined based on a color corresponding to the abnormal nozzle.

According to this aspect, if the computer reads out the program and executes the process in accordance with the read program, it is possible to achieve the same effects as the first aspect of the invention.

Preferably, in the creating of the printing data, created is printing data in which a dot is not formed for a part or all of pixel data with respect to the pixel data having a pixel value among the pixel data corresponding to the nozzle related to the banding in the second image data, whose ink ejection amount is not more than a predetermined amount.

According to this aspect, if the computer reads out the program and executes the process in accordance with the read program, it is possible to achieve the same effects as the first aspect of the invention.

According to a third aspect of the invention, there is provided a computer readable recording medium in which the above-mentioned printing device controlling program is recorded.

Thereby, it is possible to achieve the same effects as the above-mentioned printing device controlling program, and the printing program can be easily exchanged through a recording medium such as a CD-ROM or a DVD-ROM, an MO or the like.

According to a fourth aspect, there is provided a method of controlling a printing device which prints a color image to be printed on a printing medium by a printing head. The printing head has a plurality of nozzles corresponding to a plurality of colors of ink for forming a dot on the printing medium. The method includes: acquiring first image data having a plurality of pixel data corresponding to a pixel value of an M value (M $\geq$ 2) corresponding to each color of the color image; creating second image data by changing a pixel value of pixel data corresponding to an abnormal nozzle related to the banding in the first image data based on nozzle information capable of identifying a nozzle related to banding among the plurality of nozzles; creating printing data by converting the second image data into dot forming pattern data corresponding to each color of a color image so as to form the color image constructed by the second image data on the printing medium; and printing the color image constructed by the second image data on the printing medium by the printing head based on the printing data. During the creating of the second image data, a pixel value of pixel data corresponding to the abnormal nozzle is changed into a value capable of preventing or reducing the banding, and after changing the pixel value, a pixel value of pixel data corresponding to a nozzle of a color different from the color of the ink ejected by the abnormal nozzle related to the printing of an image portion of a predetermined color is changed such that the predetermined color is within the same color range, with respect to the image portion of the predetermined color printed by nozzles corresponding to a plurality of colors including the abnormal nozzle in the color image configured by the first image data.

Specifically, during the acquiring of the image data, the program stored in a storage medium such as a ROM is loaded on the RAM, the CPU executes the loaded program, and the input device such as the scanner or the like, a storage device such as the HDD, and the input/output I/F or the like cooperates with each other, so that the process is executed. Further, in the creating of the second image data, the program stored in the storage medium such as an ROM or the like is loaded on the RAM, the CPU executes the loaded program, and the process is executed using the various data such as the nozzle information stored in the storage device. In addition, in the creating of the printing data, the program stored in the storage medium such as an ROM or the like is loaded on the RAM, CPU executes the loaded program, and the process is executed using the various data such as the second image data or the like stored in the storage device. In addition, during the printing, the program stored in the storage medium such as an ROM or the like is loaded on the RAM, the CPU executes the loaded program, the printing data or various control signals or the like stored in the storage device are input to the output device composed of a driving mechanism such as the printing head or paper transporting mechanism, and the process is executed by controlling the output device (printing unit).

Thereby, it is possible to achieve the same effect as the first aspect of the invention.

Preferably, during the creating of the second image data, a pixel value of pixel data corresponding to the abnormal nozzle is changed into a value where the ink ejection amount of the abnormal nozzle becomes smaller than the ink ejection amount before the change, a pixel value of pixel data corresponding to a nozzle of another color different from the color of the ink ejected by the abnormal nozzle related to the printing of the image portion of the predetermined color is changed into a value compensating for the reduced ink ejection amount of the nozzle of another color from the ink ejection amount before the change in the abnormal nozzle, and second image data is created in which the predetermined color is within a range of the same color.

Thereby, it is possible to achieve the same effect as the first aspect of the invention.

Preferably, the range of the same color is a range in which the color difference $\Delta E$ between an image portion before changing the pixel value and an image portion after changing the pixel value satisfies the condition ($0 \leq \Delta E \leq 0.7$) in a Lab color space.

Thereby, it is possible to achieve the same effect as the first aspect of the invention.

Preferably, another color different from the color of the ink ejected by the abnormal nozzle is a color of another system different from a system of the color of the ink ejected by the abnormal nozzle.

Thereby, it is possible to achieve the same effect as the first aspect of the invention.

Preferably, another color different from the color of the ink ejected by the abnormal nozzle is a color of the same system as the color of the ink ejected by the abnormal nozzle.

Thereby, it is possible to achieve the same effect as the first aspect of the invention.

Preferably, another color different from the color of the ink ejected by the abnormal nozzle includes a color of another system different from a system of the color of the ink ejected by the abnormal nozzle and a color of the same system as the color of the ink ejected by the abnormal nozzle.

Thereby, it is possible to achieve the same effect as the first aspect of the invention.

Preferably, during creating of the second image data, determined is a changed value of a pixel value corresponding to the abnormal nozzle based on a color corresponding to the abnormal nozzle.

Thereby, it is possible to achieve the same effect as the first aspect of the invention.

Preferably, during the creating of the printing data, created is printing data in which a dot is not formed for a part or all of pixel data with respect to the pixel data having a value among the pixel data corresponding to the nozzle related to the banding in the second image data, whose ink ejection amount is not more than a predetermined amount.

Thereby, it is possible to achieve the same effect as the first aspect of the invention.

According to a fifth aspect of the invention, there is provided a printing data creating device which creates printing data used in a printing device which prints a color image to be printed on a printing medium by a printing head. The printing head has a plurality of nozzles corresponding to a plurality of colors of ink for forming a dot on the printing medium. The printing data creating device includes: an image data acquiring unit that acquires first image data having a plurality of pixel data corresponding to a pixel value of an M value ($M \geqq 2$) corresponding to each color of the color image; a nozzle information storing unit that stores nozzle information capable of identifying a nozzle related to banding among the plurality of nozzles; a second image data creating unit that creates second image data by changing a pixel value of pixel data corresponding to an abnormal nozzle related to the banding in the first image data based on the nozzle information; and a printing data creating unit that creates printing data by converting the second image data into dot forming pattern data corresponding to each color of a color image so as to form the color image constructed by the second image data on the printing medium. In addition, the second image data creating unit changes a pixel value of pixel data corresponding to the abnormal nozzle into a value capable of preventing or reducing the banding, and after changing the pixel value, changes a pixel value of pixel data corresponding to a nozzle of a color different from the color of the ink ejected by the abnormal nozzle related to the printing of an image portion of a predetermined color such that the predetermined color is within the same color range, with respect to the image portion of the predetermined color printed by nozzles corresponding to a plurality of colors including the abnormal nozzle in the color image configured by the first image data.

According to this aspect, the printing unit for performing the printing like the printing device is not provided, and the printing data according to the characteristic of the printing head is created based on the image data of an original M value.

Therefore, it is possible to achieve the same effect as the first aspect of the invention. For example, the printing process can be executed in the printing device by only transmitting the created printing data to the printing device. Therefore, the existing inkjet type of printing device can be used as it is without preparing the exclusive printing device.

In addition, since a general-purpose information processing device such as the personal computer can be used, the existing printing system composed of a printing instruction device such as the personal computer or the like and the inkjet printer can be used as it is.

Preferably, the second image data creating unit changes a pixel value of pixel data corresponding to the abnormal nozzle into a value where the ink ejection amount of the abnormal nozzle becomes smaller than the ink ejection amount before the change, changes a pixel value of pixel data corresponding to a nozzle of another color different from the color of the ink ejected by the abnormal nozzle related to the printing of the image portion of the predetermined color into a value compensating for the reduced ink ejection amount of the nozzle of another color from the ink ejection amount before the change in the abnormal nozzle, and creates second image data in which the predetermined color is within a range of the same color.

Thereby, it is possible to achieve the same effect as the first aspect of the invention.

Preferably, the range of the same color is a range in which the color difference $\Delta E$ between an image portion before changing the pixel value and an image portion after changing the pixel value satisfies the condition ($0 \leqq \Delta E \leqq 0.7$) in a Lab color space.

Thereby, it is possible to achieve the same effect as the first aspect of the invention.

Preferably, another color different from the color of the ink ejected by the abnormal nozzle is a color of another system different from a system of the color of the ink ejected by the abnormal nozzle.

Thereby, it is possible to achieve the same effect as the first aspect of the invention.

Preferably, another color different from the color of the ink ejected by the abnormal nozzle is a color of the same system as the color of the ink ejected by the abnormal nozzle.

Thereby, it is possible to achieve the same effect as the first aspect of the invention.

Preferably, another color different from the color of the ink ejected by the abnormal nozzle includes a color of another system different from a system of the color of the ink ejected by the abnormal nozzle and a color of the same system as the color of the ink ejected by the abnormal nozzle.

Thereby, it is possible to achieve the same effect as the first aspect of the invention.

Preferably, the second image data creating unit determines a changed value of a pixel value corresponding to the abnormal nozzle based on a color corresponding to the abnormal nozzle.

Thereby, it is possible to achieve the same effect as the first aspect of the invention.

Preferably, the printing data creating unit creates printing data in which a dot is not formed for a part or all of pixel data with respect to the pixel data having a pixel value among the pixel data corresponding to the nozzle related to the banding in the second image data, whose ink ejection amount is not more than a predetermined amount.

Thereby, it is possible to achieve the same effect as the first aspect of the invention.

According to a sixth aspect of the invention, there is provided a program for creating printing data which is used in a printing device which prints a color image to be printed on a printing medium by a printing head. The printing head has a plurality of nozzles corresponding to a plurality of colors of ink for forming a dot on the printing medium. The program is used for a computer to execute a process. The process includes: acquiring first image data having a plurality of pixel data corresponding to a pixel value of an M value ($M \geqq 2$) corresponding to each color of the color image; creating second image data by changing a pixel value of pixel data corresponding to an abnormal nozzle related to the banding in the first image data based on nozzle information capable of identifying a nozzle related to banding among the plurality of nozzles; and creating printing data by converting the second image data into dot forming pattern data corresponding to each color of a color image so as to form the color image constructed by the second image data on the printing medium. In addition, during the creating of the second image data, a pixel value of pixel data corresponding to the abnormal nozzle is changed into a value capable of preventing or reducing the banding, and after changing the pixel value, a pixel value of pixel data corresponding to a nozzle of a color different from the color of the ink ejected by the abnormal nozzle related to the printing of an image portion of a predetermined color is changed such that the predetermined color is within the same color range, with respect to the image portion of the predetermined color printed by nozzles corresponding to a plurality of colors including the abnormal nozzle in the color image configured by the first image data.

According to this aspect, since the computer reads out the program and then executes the process in accordance with the read program, it is possible to achieve the same effect as the fifth aspect of the invention.

Preferably, during the creating of the second image data, a pixel value of pixel data corresponding to the abnormal nozzle is changed into a value where the ink ejection amount of the abnormal nozzle becomes smaller than the ink ejection amount before the change, a pixel value of pixel data corresponding to a nozzle of another color different from the color of the ink ejected by the abnormal nozzle related to the printing of the image portion of the predetermined color is changed into a value compensating for the reduced ink ejection amount of the nozzle of another color from the ink ejection amount before the change in the abnormal nozzle, and second image data is created in which the predetermined color is within a range of the same color.

According to this aspect, since the computer reads out the program and then executes the process in accordance with the read program, it is possible to achieve the same effect as the fifth aspect of the invention.

Preferably, the range of the same color is a range in which the color difference $\Delta E$ between an image portion before changing the pixel value and an image portion after changing the pixel value satisfies the condition ($0 \leq \Delta E \leq 0.7$) in a Lab color space.

According to this aspect, since the computer reads out the program and then executes the process in accordance with the read program, it is possible to achieve the same effect as the fifth aspect of the invention.

Preferably, another color different from the color of the ink ejected by the abnormal nozzle is a color of another system different from a system of the color of the ink ejected by the abnormal nozzle.

According to this aspect, since the computer reads out the program and then executes the process in accordance with the read program, it is possible to achieve the same effect as the fifth aspect of the invention.

Preferably, another color different from the color of the ink ejected by the abnormal nozzle is a color of the same system as the color of the ink ejected by the abnormal nozzle.

According to this aspect, since the computer reads out the program and then executes the process in accordance with the read program, it is possible to achieve the same effect as the fifth aspect of the invention.

Preferably, another color different from the color of the ink ejected by the abnormal nozzle includes a color of another system different from a system of the color of the ink ejected by the abnormal nozzle and a color of the same system as the color of the ink ejected by the abnormal nozzle.

According to this aspect, since the computer reads out the program and then executes the process in accordance with the read program, it is possible to achieve the same effect as the fifth aspect of the invention.

Preferably, during the creating of the second image data, determined is a changed value of a pixel value corresponding to the abnormal nozzle based on a color corresponding to the abnormal nozzle.

According to this aspect, since the computer reads out the program and then executes the process in accordance with the read program, it is possible to achieve the same effect as the fifth aspect of the invention.

Preferably, during the creating of the printing data, created is printing data in which a dot is not formed for a part or all of pixel data with respect to the pixel data having a pixel value among the pixel data corresponding to the nozzle related to the banding in the second image data, whose ink ejection amount is not more than a predetermined amount.

According to this aspect, since the computer reads out the program and then executes the process in accordance with the read program, it is possible to achieve the same effect as the fifth aspect of the invention.

According to a seventh aspect of the invention, there is provided a computer readable recording medium in which the above-mentioned printing data creating program is recorded.

Thereby, it is possible to achieve the same effects as the sixth aspect of the invention, and the printing program can be easily exchanged through the recording medium such as a CD-ROM or a DVD-ROM, an FD (flexible disk) or the like.

According to an eighth aspect of the invention, there is provided a method of creating printing data which is used in a printing device which prints a color image to be printed on a printing medium by a printing head. The printing head has a plurality of nozzles corresponding to a plurality of colors of ink for forming a dot on the printing medium. The method includes: acquiring first image data having a plurality of pixel data corresponding to a pixel value of an M value ($M \geq 2$) corresponding to each color of the color image; creating second image data by changing a pixel value of pixel data corresponding to an abnormal nozzle related to the banding in the first image data based on nozzle information capable of identifying a nozzle related to banding among the plurality of nozzles; and creating printing data by converting the second image data into dot forming pattern data corresponding to each color of a color image so as to form the color image constructed by the second image data on the printing medium. During the creating of the second image data, a pixel value of pixel data corresponding to the abnormal nozzle is changed into a value capable of preventing or reducing the banding, and after changing the pixel value, a pixel value of pixel data corresponding to a nozzle of a color different from the color of the ink ejected by the abnormal nozzle related to the printing of an image portion of a predetermined color such that the predetermined color is within the same color range is changed, with respect to the image portion of the predetermined color printed by nozzles corresponding to a plurality of colors including the abnormal nozzle in the color image configured by the first image data.

Specifically, during the acquiring of the image data, the program stored in a storage medium such as a ROM is loaded on the RAM, the CPU executes the loaded program, and the input device such as the scanner or the like, a storage device such as the HDD, and the input/output I/F or the like cooperates with each other, so that the process is executed. Further, in the creating of the second image data, the program stored in the storage medium such as an ROM or the like is loaded on the RAM, the CPU executes the loaded program, and the process is executed using the various data such as the nozzle information stored in the storage device. In addition, in the creating of the printing data, the program stored in the storage medium such as an ROM or the like is loaded on the RAM, the CPU executes the loaded program, and the process is executed using the various data such as the second image data or the like stored in the storage device.

Thereby, it is possible to achieve the same effect as the fifth aspect of the invention.

Preferably, during the creating of the second image data, a pixel value of pixel data corresponding to the abnormal nozzle is changed into a value where the ink ejection amount of the abnormal nozzle becomes smaller than the ink ejection amount before the change, a pixel value of pixel data corresponding to a nozzle of another color different from the color of the ink ejected by the abnormal nozzle related to the printing of the image portion of the predetermined color is changed into a value compensating for the reduced ink ejection amount of the nozzle of another color from the ink ejection amount before the change in the abnormal nozzle, and second image data is created in which the predetermined color is within a range of the same color.

Thereby, it is possible to achieve the same effect as the fifth aspect of the invention.

Preferably, the range of the same color is a range in which the color difference ΔE between an image portion before changing the pixel value and an image portion after changing the pixel value satisfies the condition (0≦ΔE≦0.7) in a Lab color space.

Thereby, it is possible to achieve the same effect as the fifth aspect of the invention.

Preferably, another color different from the color of the ink ejected by the abnormal nozzle is a color of another system different from a system of the color of the ink ejected by the abnormal nozzle.

Thereby, it is possible to achieve the same effect as the fifth aspect of the invention.

Preferably, another color different from the color of the ink ejected by the abnormal nozzle is a color of the same system as the color of the ink ejected by the abnormal nozzle.

Thereby, it is possible to achieve the same effect as the fifth aspect of the invention.

Preferably, another color different from the color of the ink ejected by the abnormal nozzle includes a color of another system different from a system of the color of the ink ejected by the abnormal nozzle and a color of the same system as the color of the ink ejected by the abnormal nozzle.

Thereby, it is possible to achieve the same effect as the fifth aspect of the invention.

Preferably, during the creating of the second image data, determined is a changed value of a pixel value corresponding to the abnormal nozzle based on a color corresponding to the abnormal nozzle.

Thereby, it is possible to achieve the same effect as the fifth aspect of the invention.

Preferably, during the creating of the printing data, created is printing data in which a dot is not formed for a part or all of pixel data with respect to the pixel data having a pixel value among the pixel data corresponding to the nozzle related to the banding in the second image data, whose ink ejection amount is not more than a predetermined amount.

Thereby, it is possible to achieve the same effect as the fifth aspect of the invention.

BRIEF DESCRIPTION OF THE DRAWINGS

The invention will be described with reference to the accompanying drawings, wherein like numbers reference like elements.

FIG. 10A is a diagram illustrating an information table which indicates whether the respective nozzles have ejected ink and which is included in nozzle information.

FIG. 10B is a diagram illustrating an information table indicating relative flying curve amounts of the respective nozzles.

FIG. 11A is a diagram illustrating an example of an image which is formed by nozzles corresponding to the respective colors of CMYK including abnormal nozzles and which is obtained before changing a color ratio.

FIG. 11B is a diagram illustrating an example of an image obtained after changing the color ratio in FIG. 11A.

FIG. 12 is a diagram illustrating an information table indicating a mixed ratio of each color which is included in the color ratio information and which can prevent banding.

FIG. 17 is a diagram illustrating an example of a color ratio changing process course in a case in which a nozzle corresponding to light cyan is related to banding.

DESCRIPTION OF EXEMPLARY EMBODIMENTS

First Embodiment

Hereinafter, a first embodiment of the invention will be described with reference to the accompanying drawings. FIGS. 1 to 14 illustrate a printing device, a program for controlling a printing device, a method of controlling a printing device, a printing data creating device, a program for creating printing data, and a method of creating printing data according to the first embodiment of the invention.

Figure 1:
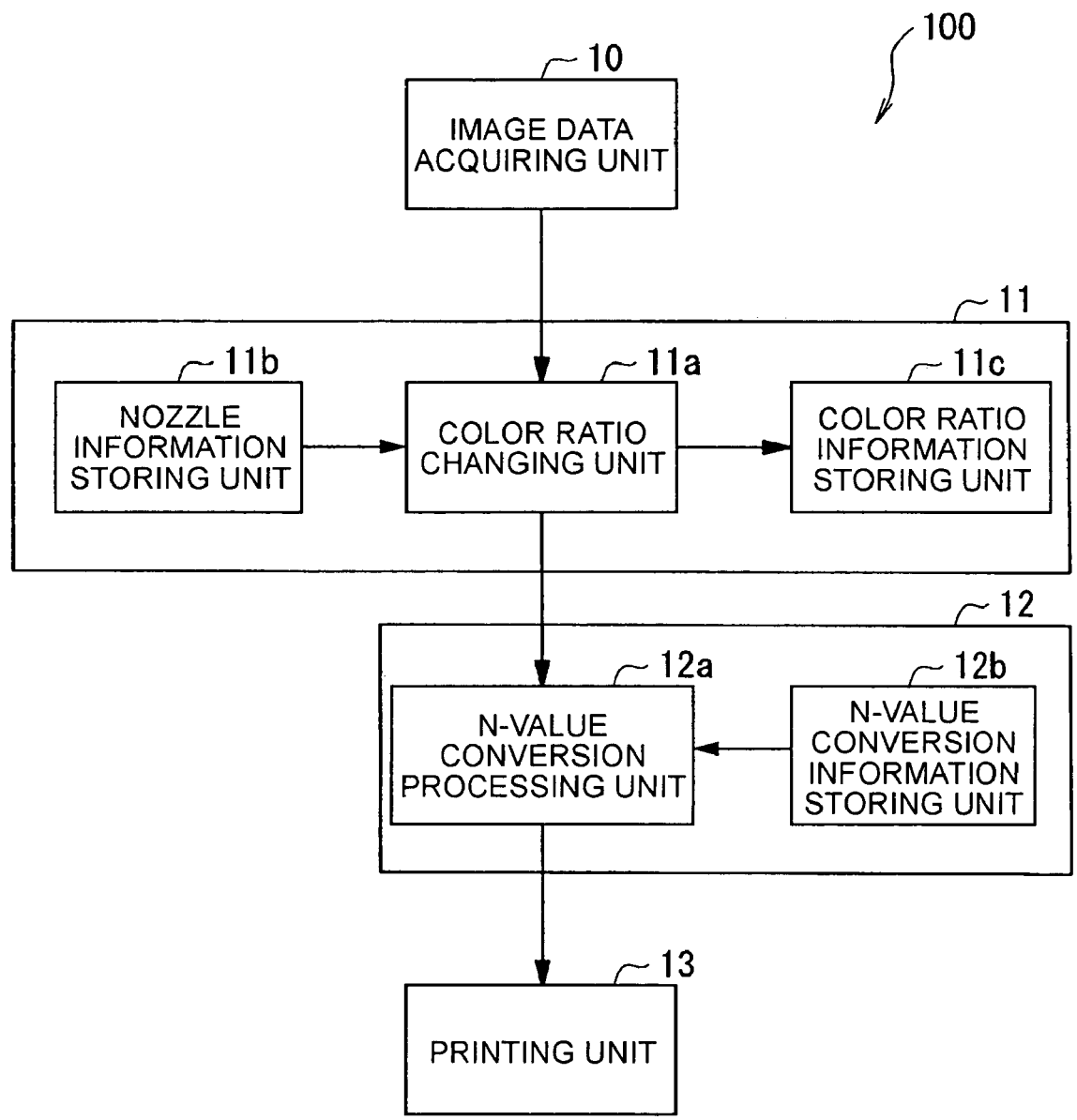
FIG. 1 is a block diagram illustrating a structure of a printing device according to a first embodiment of the invention.

First, a structure of a printing device 100 according to the first embodiment of the invention will be described with reference to FIG. 1. FIG. 1 is a block diagram illustrating the structure of the printing device 100 according to the first embodiment of the invention.

The printing device 100 is a line-head-type printing device. AS shown in FIG. 1, the printing device 100 includes an image data acquiring unit 10 that acquires image data for forming a predetermined image from an external device or a storage device, a second image data creating unit 11 that creates second image data by changing a mixed ratio of the color of a portion of an image corresponding to a nozzle related to banding so as to prevent or reduce the banding, a printing data creating unit 12 that creates printing data for printing an image of the second image data on a printing medium (in this case, printing paper), and a printing unit 13 that prints an image of image data on the printing medium by an inkjet method based on the printing data.

The image data acquiring unit 10 has a function for acquiring image data of an M value (M≧3) (for example, color image data in which a gray-scale level (luminance value) for every color (R, G, and B) of each pixel is represented with eight bits (0 to 255). The image data acquiring unit 10 can acquire the image data from an external device through a network such as a LAN and WAN in accordance with printing instructions from input devices provided in the external device and the image data acquiring unit 10 or can acquire the image data from a recording medium such as a CD-ROM, a DVD-ROM or the like through a driving device such a CD drive, a DVD drive or the like (not shown) provided in the image data acquiring unit 10 or can acquire the image data from a storage device 70 (which will be described in detail below) provided in the image data acquiring unit 10. In the present embodiment, the image data acquiring unit 10 also has a function for subjecting RGB data of multiple values to a color changing process to covert them into CMYK data (case of four colors) of multiple values corresponding to the respective inks of the printing head 200.

The second image data creating unit 11 has a color ratio changing unit 11a, a nozzle information storing unit 11b, and a color ratio information storing unit 11c.

The color ratio changing unit 11a creates second image data by converting a pixel value of pixel data corresponding to a nozzle related to banding in the first image data having been converted into the CMYK data (hereinafter, referred to as CMYK image data) based on the nozzle information stored in the nozzle information storing unit 11b and the color ratio information stored in the color ratio information storing unit 11c.

The nozzle information storing unit 11b stores nozzle information that identifies a nozzle related to banding among a plurality of nozzles constituting the printing head 200.

The color ratio information storing unit 11c stores a color ratio information that is information of a color changing ratio for a nozzle module, corresponding to each color, of the printing head 200 corresponding to the plurality of colors of ink so as to prevent or reduce banding from occurring. In this case, the color ratio information includes information indicating a maximum mixed ratio of each color that can prevent the banding, color changing information (or color combination information) for obtaining granularity, information necessary when a mixed ratio of the color of an image portion corresponding to the banding varies or the like.

The printing data creating unit 12 has an N-value conversion processing unit 12a and an N-value conversion information storing unit 12b.

The N-value conversion processing unit 12a has a function for performing an N-value conversion process (in this case, M>N≧2) on the second image data based on the N-value conversion information stored in the N-value conversion information storing unit 12b so as to convert it into printing data used in a printing unit 13 of an inkjet type (which will be described in detail below), that is, data indicating whether a dot is formed having a predetermined color and size for each pixel data in the second image data or not (hereinafter, referred to as 'binarization' and 'halftoning').

The N-value conversion information storing unit 12b stores N-value conversion information, such as a threshold value set for each dot size or the like, which is necessary for performing an N-value conversion process.

Figure 3:
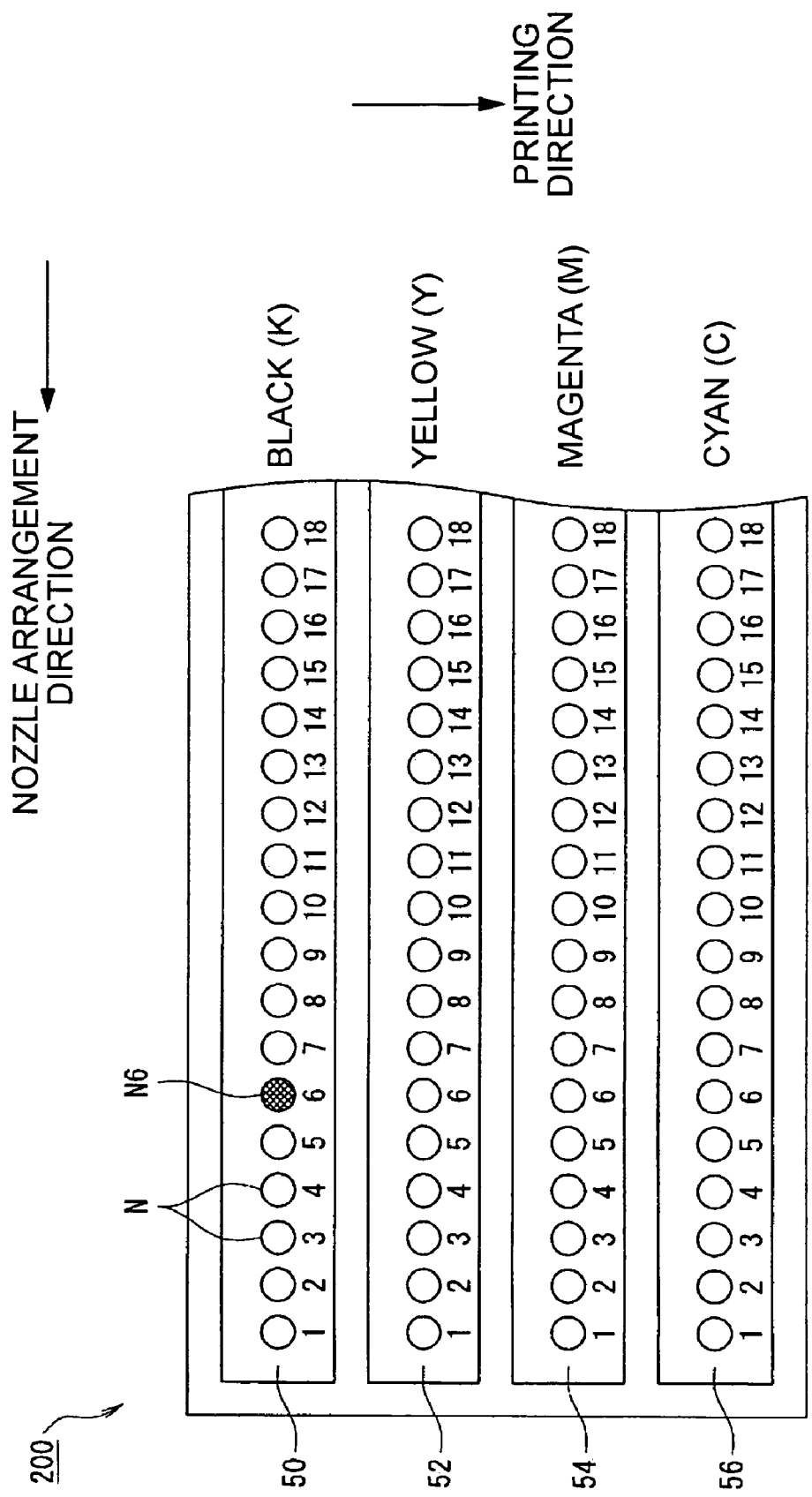
FIG. 3 is a partial enlarged bottom view illustrating a structure of a printing head according to the first embodiment of the invention.
Figure 4:
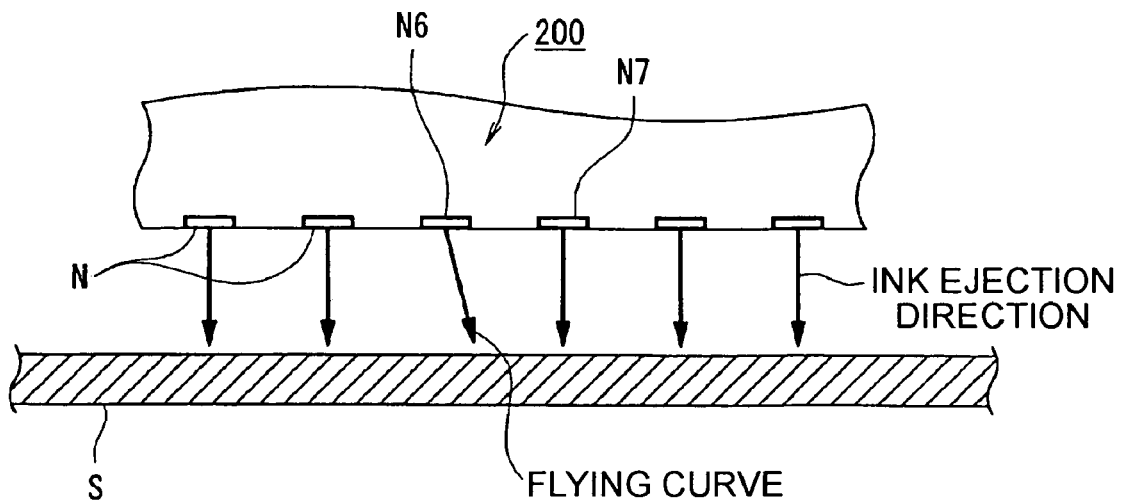
FIG. 4 is a partial enlarged side view of the printing head according to the first embodiment of the invention.

FIG. 3 is a partial enlarged bottom view illustrating a structure of the printing head 200 according to the first embodiment of the invention included in the printing unit 13, and FIG. 4 is a partial enlarged side view thereof.

As shown in FIG. 3, the printing head 200 has a structure in which it has four nozzle modules including a black nozzle module 50, a yellow nozzle module 52, a magenta nozzle module 54, and a cyan nozzle module 56. In the black nozzle module 50, a plurality of nozzles N (in FIG. 3, eighteen) each of which exclusively ejects black (K) ink are linearly arranged in a nozzle arrangement direction. In the yellow nozzle module 52, a plurality of nozzles N each of which exclusively ejects yellow (Y) ink are linearly arranged in a nozzle arrangement direction. In the magenta nozzle module 54, a plurality of nozzles N each of which exclusively ejects magenta (M) ink are linearly arranged in a nozzle arrangement direction. In the cyan nozzle module 56, a plurality of nozzles N each of which exclusively ejects cyan (M) ink are linearly arranged in a nozzle arrangement direction. In addition, the four nozzle modules 50, 52, 54, and 56 are integrally arranged such that nozzles N each having the same number in the four nozzle modules 50, 52, 54, and 56 are linearly arranged in a printing direction (a direction vertical to a nozzle arrangement direction), as shown in FIG. 3. Accordingly, the plurality of nozzles N constituting each of the nozzle modules are linearly arranged in a nozzle arrangement direction, and the nozzles N each having the same number in the four nozzle modules 50, 52, 54, and 56 are linearly arranged in a printing direction.

In addition, the printing head 200 having the above-mentioned structure ejects ink supplied to an ink chamber (not shown) provided for each of the nozzles N1, N2, N3, ... from each of the nozzles N1, N2, N3, ... by a voltage element such as a piezoelectric element (piezo actuator) (not shown) or the like provided for each ink chamber and prints a circular dot on white printing paper. Further, the printing head 200 can control a voltage applied to the piezoelectric element in a multi-stage so as to control an ink ejection amount from each ink chamber, and can print a dot having a different size for each of the nozzles N1, N2, N3, . . . , and N18. In addition, there is a case in which a voltage is applied in time series to nozzles in two stages for a short time and one dot is formed on printing paper by combining two ejections. In this case, by using a phenomenon that an ejection speed is different by a dot size and ejecting dots in the order from a small dot to a large dot, ink lands at almost the same location of the paper, so that one larger dot can be formed. FIG. 4 is a diagram illustrating a state in which the sixth nozzle N6 from the left side in the black nozzle module 50 among the four nozzle modules 50, 52, 54, and 56 causes a flying curve phenomenon to occur, and the ink is ejected onto a printing medium S from the sixth nozzle N6 in a slant direction, so that a dot formed on the printing medium S is formed in the vicinity of a dot which is ejected from a normal nozzle N7 adjacent to the nozzle N6 and formed on the printing medium S.

Referring to FIGS. 1 and 3 again, the printing unit 13 is an inkjet-type printer constructed such that ink is ejected from the nozzle modules 50, 52, 54, and 56 formed in the printing head 200 in a dot shape while moving one side or both sides of the printing medium and the printing head 200 and a predetermined image composed of a plurality of dots is formed on the recording medium S. In addition to the above-mentioned printing head 200, the printing head 200 may include a printing head transporting mechanism (a multipass type) (not shown) that makes the printing medium S reciprocate in a widthwise direction, a paper transporting mechanism (not shown) that makes the printing medium S move, and a printing control mechanism (not shown) that control the ink ejection of the printing head 200 based on the printing data.

Figure 2:
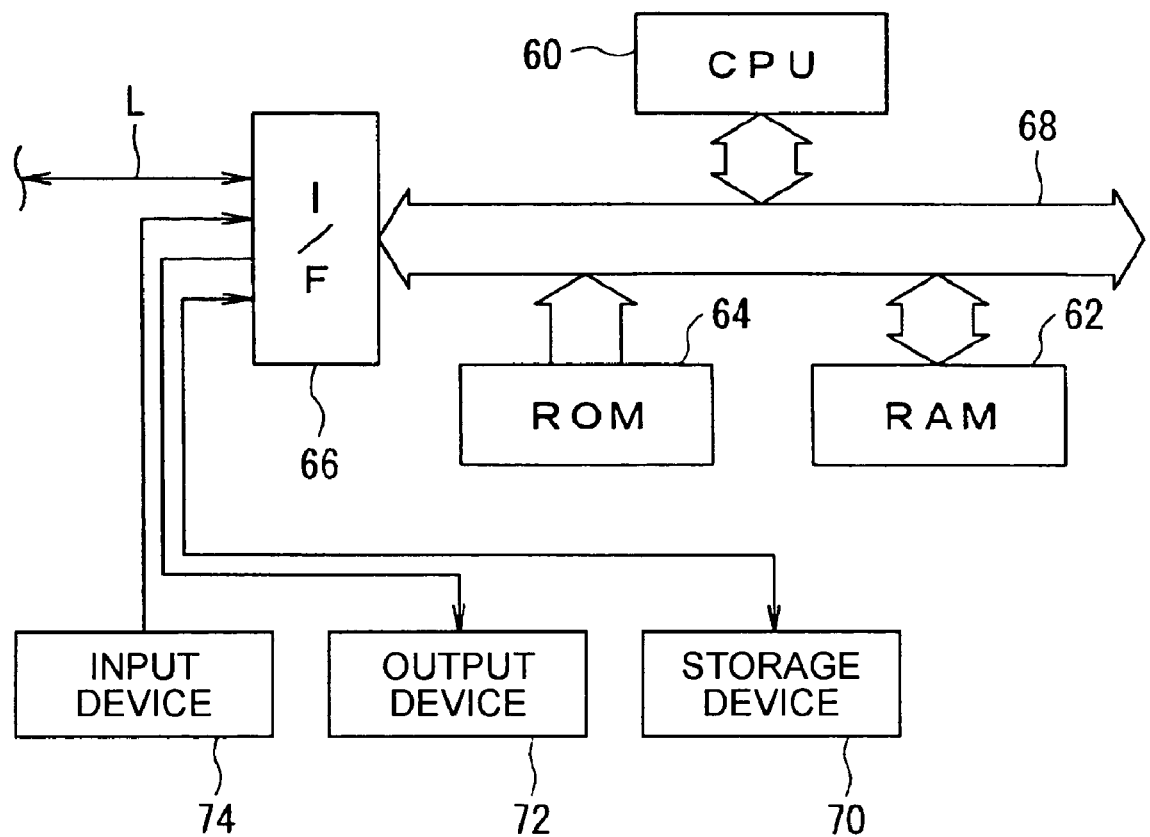
FIG. 2 is a diagram illustrating a hardware structure of a computer system.

Further, the printing device 100 includes a computer system that implements the respective functions of the image data acquiring unit 10, the second image data creating unit 11, the printing data creating unit 12, the printing unit 13 or the like on software and implements software for controlling hardware necessary for implementing the above-mentioned functions. As shown in FIG. 2, the computer system has a hardware structure in which a CPU 60 (central processing unit) serving as a central operation processing unit for performing various control or operation processes, an RAM 62 (random access memory) constituting a main storage device (main storage), and an ROM 64 (read only memory) serving as an exclusive reading storage device are connected to one another through an inner bus 68 composed of a PCI (peripheral component interconnect) bus or an ISA (industrial standard architecture) bus, and an external storage device 70 (secondary storage device) such as an HDD or the like, an output device 72 such as a printing unit 13, a CRT monitor, an LCD monitor or the like, an input device 74 such as an operation panel, a mouse, a keyboard, a scanner or the like, and a network cable L which communicates with a printing instruction device (not shown) or the like are connected to the bus 68 through an input/output interface (I/F) 66.

In addition, if a power is supplied, a system program such as a BIOS or the like stored in the ROM 64 or the like loads various exclusive computer programs stored in the ROM 64 in advance or various exclusive computer programs installed in the storage device 70 through a storage medium such as a CD-ROM, a DVD-ROM, and a flexible disk (FD or floppy disk) or a communication network such as the Internet or the like on the RAM 62 in the same manner, and the CPU 60 performs predetermined control and operation processes by driving various resources in accordance with commands described in the programs loaded on the RAM 62 and makes the above-mentioned respective functions implemented on the software.

Figure 5:
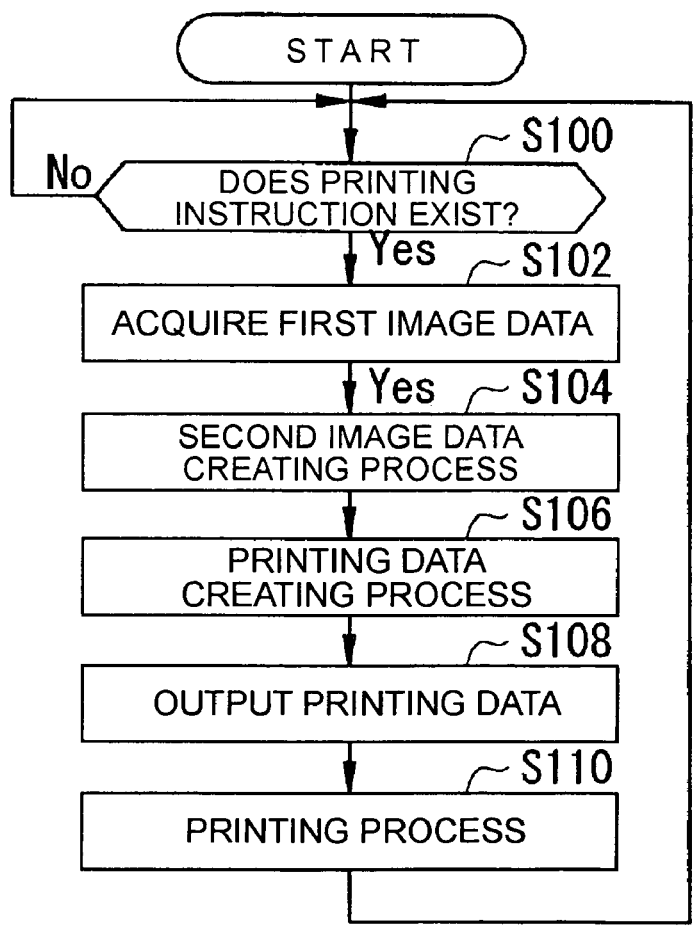
FIG. 5 is a flowchart illustrating a printing process of the printing device.

Further, the printing device 100 drives a predetermined program stored in a predetermined region of the ROM 64 by the CPU 60, and executes a printing process illustrated in a flowchart of FIG. 5 in accordance with the corresponding program. In addition, as described above, generally, the printing head 200 for forming dots forms dots of a plurality of kinds of colors (four colors and six colors) of dots at almost the same time. In the present embodiment, the printing head 200 has nozzle modules corresponding to the ink of the four colors of CMYK.

FIG. 5 is a flowchart illustrating a printing process in the printing device 100.

If the CPU 60 executes the printing process, first, the process proceeds to step S100, as shown in FIG. 5.

In step S100, in the image data acquiring unit 10, printing instruction information is transmitted from an external device connected through the network cable L or printing instruction information is input through the input device 74, so that it is determined whether printing has been instructed. In this case, if it is determined that the printing has been instructed (Yes), the process proceeds to step S102, and if it is determined that the printing has not been instructed (No), a determination process is repeated until the printing is instructed.

When the process proceeds to step S102, the image data acquiring unit 10 performs a process for acquiring image data corresponding to the printing instruction from a recording medium such as an external device, a CD-ROM, a DVD-ROM or the like and a storage device 70 such as an HDD or the like, as described above. Thereby, it is determined whether the first image data has been acquired. In this case, if it is determined that the first image data has been acquired (Yes), the acquired first image data is transmitted to the second image data creating unit 11, and a process proceeds to step S104. In contrast, if it is determined that the first image data has not been acquired (No), a message indicating that the printing cannot be performed is transmitted to a printing instruction source, then the printing process with respect to the printing instruction is discarded and then the process proceeds to step S100.

In this case, the first image data is data constructed such that pixel data of a plurality of M values corresponding to the respective colors of CMYK is arranged in a matrix, and a row direction of the first image data is equal to a nozzle arrangement direction of the printing head 200 and a column row of the first image data is equal to a printing direction of the printing head 200.

When the process proceeds to step S104, the second image data creating unit 11 executes the second image data creating process to create the second image data, and the process proceeds to step S106.

In step S106, the printing data creating unit 12 executes the printing data creating process so as to create the printing data, and the process proceeds to step S108.

In step S108, the printing data creating unit 12 outputs the printing data created in step S106 to the printing unit 13, and the process proceeds to step S110.

In step S110, the printing unit 13 executes the printing process based on the printing data output from the printing data creating unit 12, and the process proceeds to step S100

Next, the second image data creating process in step S104 will be described in detail with reference to FIG. 6.

Figure 6:
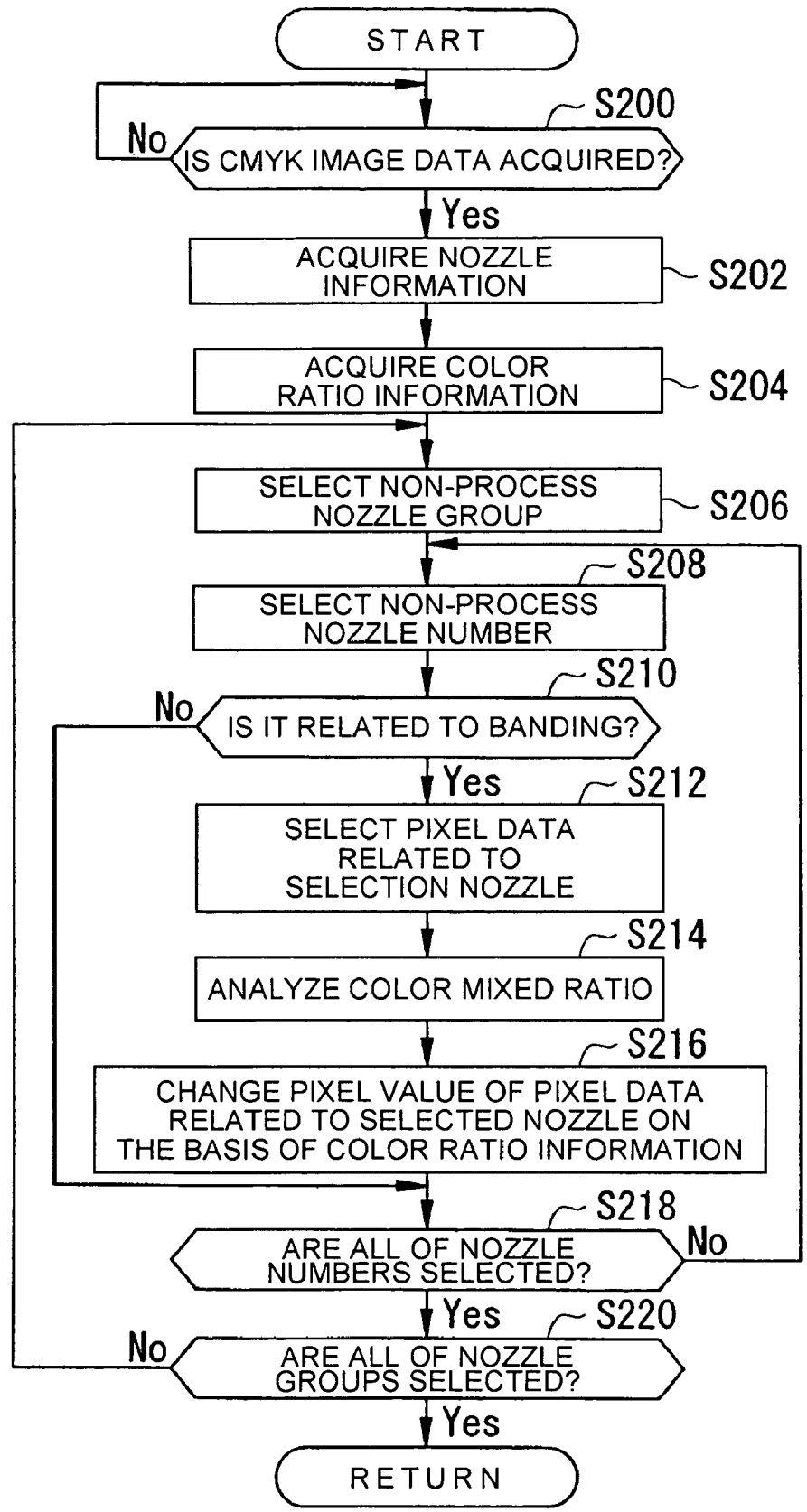
FIG. 6 is a flowchart illustrating a second image data creating process in a second image data creating unit of the printing device according to the first embodiment of the invention.

FIG. 6 is a flowchart illustrating the second image data creating process in the second image data creating unit 11 of the printing device 100.

The second image data creating process creates the second image data by changing a pixel value of the pixel data of the image portion corresponding to the nozzle related to banding based on the color ratio information prepared in advance. If the second image data creating process is executed in step S104, first, the process proceeds to step S200, as shown in FIG. 6.

In step S200, in the color ratio changing unit 11a, it is determined whether the CMYK image data has been acquired from the image data acquiring unit 10. In this case, if it is determined that the CMYK image data has been acquired from the image data acquiring unit 10 (Yes), the process proceeds to step S202. In contrast, if it is determined that the CMYK image data has not been acquired from the image data acquiring unit 10 (No), the determination process is repeated until the CMYK image data is acquired from the image data acquiring unit 10.

When the process proceeds to step S202, the color ratio changing unit 11a reads the nozzle information from the nozzle information storing unit 11b, stores the read nozzle information in a predetermined region of the RAM 62, and obtains the corresponding nozzle information. Then, the process proceeds to step S204.

In step S204, the color ratio changing unit 11a reads the color ratio information from the color ratio information storing unit 11c, stores the read color ratio information in a predetermined region of the RAM 62, and obtains the corresponding color ratio information. Then, the process proceeds to step S206.

In step S206, the color ratio changing unit 11a selects nozzle information of a nozzle module where the second image data creating process is not performed (hereinafter, referred to as a non-process nozzle module) from the nozzle information acquired in step S202, and the process proceeds to step S208.

In step S208, the color ratio changing unit 11a selects the nozzle information corresponding to a non-process nozzle number from the nozzle information of the non-process nozzle module selected in step S206, and then the process proceeds to step S210.

In step S210, the color ratio changing unit 11a determines whether the corresponding nozzle is related to the banding based on the non-process nozzle number (hereinafter, referred to as a selected nozzle number) selected in step S208, and if it is determined by the color ratio changing unit 11a that the corresponding nozzle is related to the banding (Yes), the process proceeds to step S212. In contrast, if it is determined by the color ratio changing unit 11a that the corresponding nozzle is not related to the banding (No), the process proceeds to step S218.

When the process proceeds to step S212, the color ratio changing unit 11a selects pixel data related to a nozzle of the selected nozzle number from the CMYK image data, and then the process proceeds to step S214.

In step S214, the color ratio changing unit 11a analyzes a color mixed ratio of the pixel data selected in step S212, and then the process proceeds to step S216. In this case, a color mixed ratio analyzing process is a process that with respect to an image portion corresponding to a nozzle related to the banding (hereinafter, referred to as an abnormal nozzle) and a nozzle of another color related to the abnormal nozzle, analyzes pixel values of the respective pixel data corresponding to these nozzles and acquires to what extent a mixed ratio of each color (ink ejection ratio of each color) is. In the present embodiment, it is assumed that the number of abnormal nozzles totals eleven, that is, the five abnormal nozzles are disposed at each of left and right sides with a nozzle causing the banding to occur like a nozzle causing a flying curve to occur or a nozzle having an ink ejection failure interposed therebetween.

In step S216, the color ratio changing unit 11a changes a pixel value of the pixel data corresponding to the nozzle of each color related to the nozzle of the selected nozzle number selected in step S212 into a value by which the banding can be prevented at the maximum and the color after changing the pixel value is within the same color range as the color before changing the pixel value based on the color ratio information acquired in step S204, and then the process proceeds to step S218. In this case, the value by which the color after changing the pixel value is within the same color range as the color before changing the pixel value refers to a value by which the color difference $\Delta E$ between the color before changing the pixel value and the color after changing the pixel value is within a range of '$0 \leqq \Delta E \leqq 0.7$' in an L * a * b * colorimetric system. By changing the value such that the color difference $\Delta E$ between the color before changing the pixel value and the color after changing the pixel value can be within a range of '$0 \leqq \Delta E \leqq 0.7$', the color before changing the pixel value and the color after changing the pixel value are recognized with the same color by most of people.

In the present embodiment, the color ratio changing process is a process that reduces an ink ejection amount of the abnormal nozzle to an amount equal to or less than a quarter of the ink ejection amount (change a value of the corresponding pixel data) when the ink ejection amount of the color corresponding to the abnormal nozzle can be reduced to an amount equal to or less than a quarter of an application limit ink ejection amount, and makes a nozzle, causing the flying curve to occur (or a nozzle having an ink ejection failure) among the abnormal nozzles, not used in the N-value conversion processing unit 12 (make a dot not formed). In contrast, the color ratio changing process is a process that reduces an ink ejection amount of the abnormal nozzle to an ink ejection amount which does not cause the banding (change a value of the corresponding pixel data) when the ink ejection amount of the color corresponding to the abnormal nozzle cannot be reduced to an amount equal to or less than a quarter of an application limit ink ejection amount, and compensates for the influence of the reduced ejection amount with respect to the color before changing the pixel value by changing an ink ejection amount of a nozzle corresponding to another color (change a value of the corresponding pixel data).

In step S218, the color ratio changing unit 11a determines whether all of the nozzle numbers with respect to the selected nozzle module have been selected. In this case, if it is determined by the color ratio changing unit 11a that all of the nozzle numbers with respect to the selected nozzle module have been selected (Yes), the process proceeds to step S220. In contrast, if it is determined by the color ratio changing unit 11a that all of the nozzle numbers with respect to the selected nozzle module have been not selected (No), the process proceeds to step S208.

When the process proceeds to step S220, the color ratio changing unit 11a determines whether all of the nozzle modules have been selected. In this case, if it is determined by the color ratio changing unit 11a that all of the nozzle modules have been selected (Yes), a series of processes are completed, and the process returns to the original process. In contrast, if it is determined by the color ratio changing unit 11a that all of the nozzle modules have been not selected (No), the process proceeds to step S206.

Next, the printing data creating process of step S106 will be described in detail with reference to FIG. 7.

Figure 7:
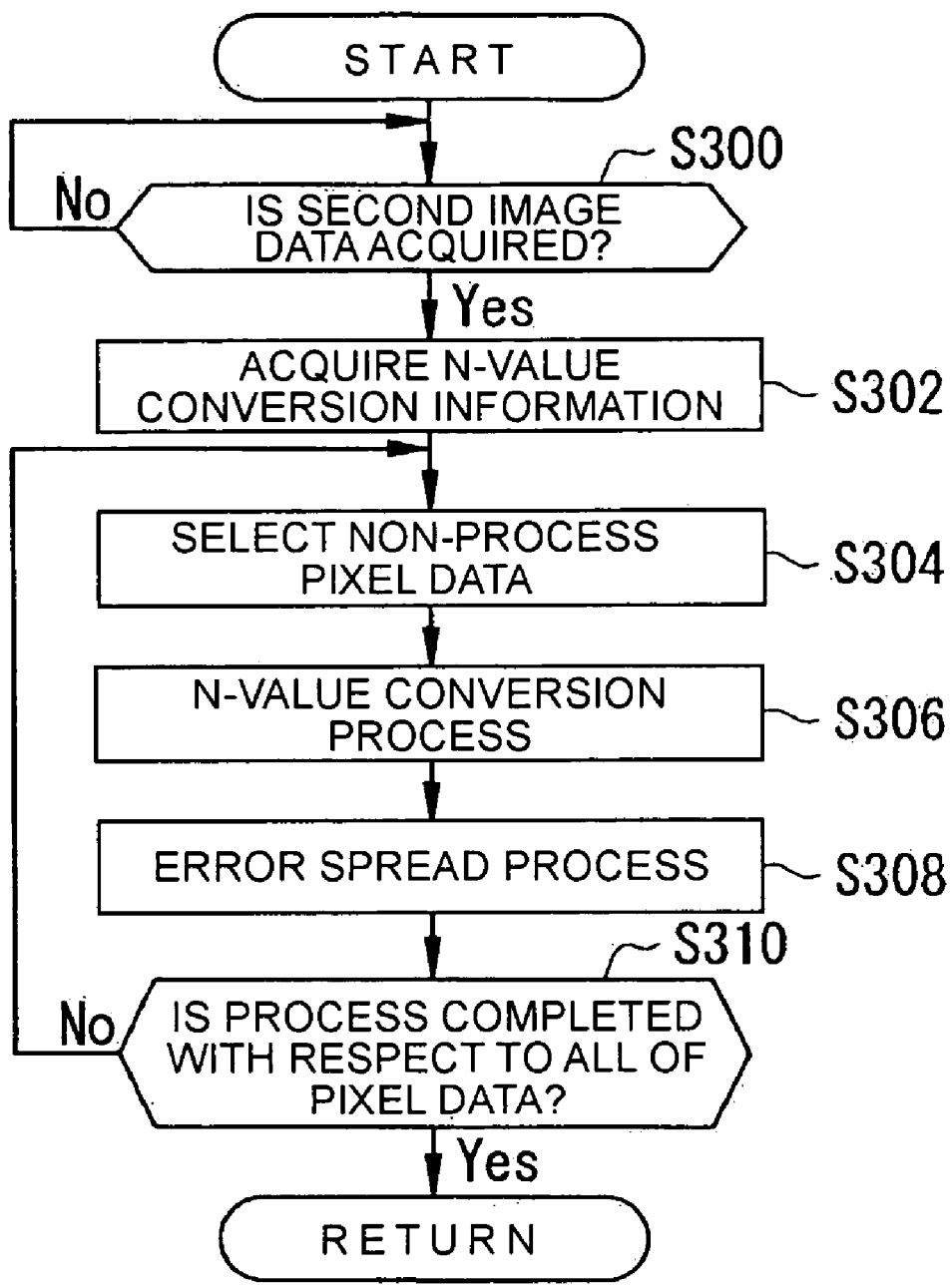
FIG. 7 is a flowchart illustrating a printing data creating process in a printing data creating unit of the printing device according to the first embodiment of the invention.

FIG. 7 is a flowchart illustrating the printing data creating process in the printing data creating unit 12 of the printing device 100.

The printing data creating process is a process that creates printing data by performing an N-value conversion process on the second image data created by the second image data creating unit 11. If the printing data creating process is executed in step S106, first, the process proceeds to step S300, as shown in FIG. 7.

In step S300, the N-value conversion processing unit 12a determines whether the second image data has been acquired from the second image data creating unit 11. In this case, if it is determined by the N-value conversion processing unit 12a that the second image data has been acquired from the second image data creating unit 11 (Yes), the process proceeds to step S302. In contrast, if it is determined by the N-value conversion processing unit 12a that the second image data has not been acquired from the second image data creating unit 11 (No), the determination process is repeated until the second image data is acquired from the second image data creating unit.

In step S302, the N-value conversion processing unit 12a reads an N-value conversion information from the N-value conversion information storing unit 12b, stores the read N-value conversion information in a predetermined region of the RAM 62, and acquires the corresponding N-value conversion information. Then, the process proceeds to step S304.

In the present embodiment, the N-value conversion information includes a threshold value of a concentration value to determine whether a dot is 'formed' or 'not formed' with respect to each of a plurality of kinds of dot formation sizes and a concentration value after performing an N-value conversion process corresponding to each dot formation size. That is, a value of the pixel data constituting image data (concentration value) is compared with the threshold value of the above-mentioned concentration value. In this case, when the value of the pixel data constituting image data is equal to or greater than the threshold value of the above-mentioned concentration value, it is determined that a dot of the corresponding size is formed, and when the value of the pixel data constituting image data is smaller than the threshold value of the above-mentioned concentration value, it is determined that a dot of the corresponding size is not formed.

In step S304, the N-value conversion processing unit 12a selects pixel data where the N-value conversion process is not performed from the second image data, and then the process proceeds to step S306.

In step S306, the N-value conversion processing unit 12a performs the N-value conversion process on the selected pixel data based on the N-value conversion information acquired in step S302, and then the process proceeds to step S308.

Here, the N-value conversion process is a process that converts a concentration value of the pixel data into '1' when it is determined that the dot is 'formed' and converts the concentration value of the pixel data into '0' when it is determined that the dot is 'not formed' based on the comparison result between the concentration values. However, a dot formation size of a largest dot among the dots determined that the dot is 'formed' is set to a dot formation size of the corresponding pixel data, and information of the dot formation size (size identification information) is associated with a numerical value '1' when it is determined that the dot is 'formed'. Therefore, the information set for each size as information of each dot formation size is associated with each size, so that in the present embodiment, as shown in FIG., 13, the dot formation size is four kinds in accordance with the respective concentration values, that is, 'small', 'middle', 'large', and the case in which the dot is 'not formed' and the dot formation size is not necessary. As a result, actually, a quarternarizing process is performed.

In step S308, the N-value conversion processing unit 12a executes an error spread process that sets the difference between the pixel value of the selected pixel data before the N-value conversion process and the pixel value of the selected pixel data after the N-value conversion process to an error and spreads the corresponding error to a pixel value corresponding to the peripheral pixel of the pixel of the selected pixel data, and then the process proceeds to step S310.

In the present embodiment, by using an error spread method in which an area gradation expression can be made, the N-value conversion process has performed. The invention is not limited thereto. In a process using a text mainly, a method of determining a value through the comparison between the threshold values of the respective pixels or a dither method that is another area gradation expression method may be used.

In step S310, the N-value conversion processing unit 12a determines whether the N-value conversion process has been completed with respect to all of the pixel data of the second image data. In this case, if it is determined by the N-value conversion processing unit 12a that the N-value conversion process has been completed with respect to all of the pixel data of the second image data (Yes), a series of processes are completed, and the process returns to the original process. In contrast, if it is determined by the N-value conversion processing unit 12a that the N-value conversion process has not been completed with respect to all of the pixel data of the second image data (No), the process proceeds to step S304.

In this case, after the N-value conversion process is completed, the second image data becomes printing data, and the corresponding printing data includes information indicating whether the dot is formed or not and identification information of the formed dot size.

Next, the operation according to the embodiment of the invention will be described with reference to FIGS. 8 to 14.

Figure 8A:
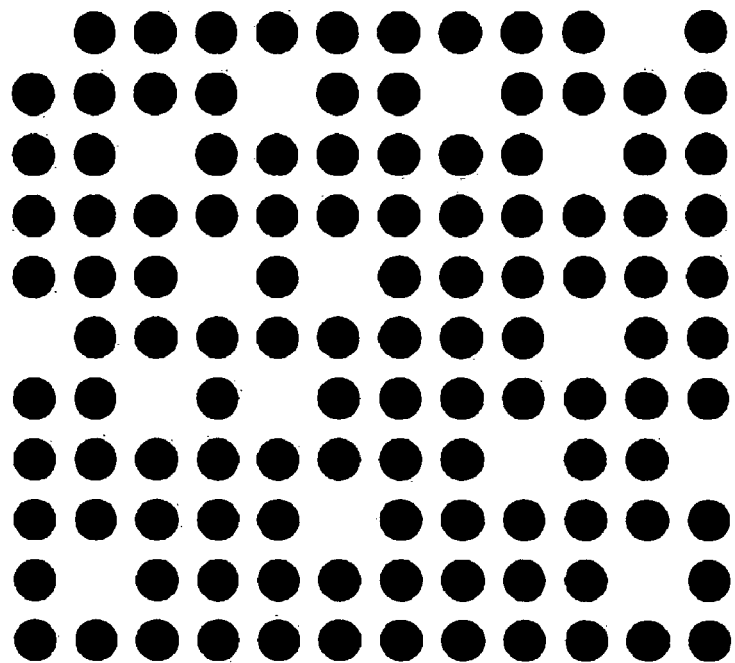
FIG. 8A is a diagram illustrating an example of a dot pattern formed by a cyan nozzle module where an abnormal nozzle, which causes a so-called flying curve to be occur, does not exist.
Figure 8B:
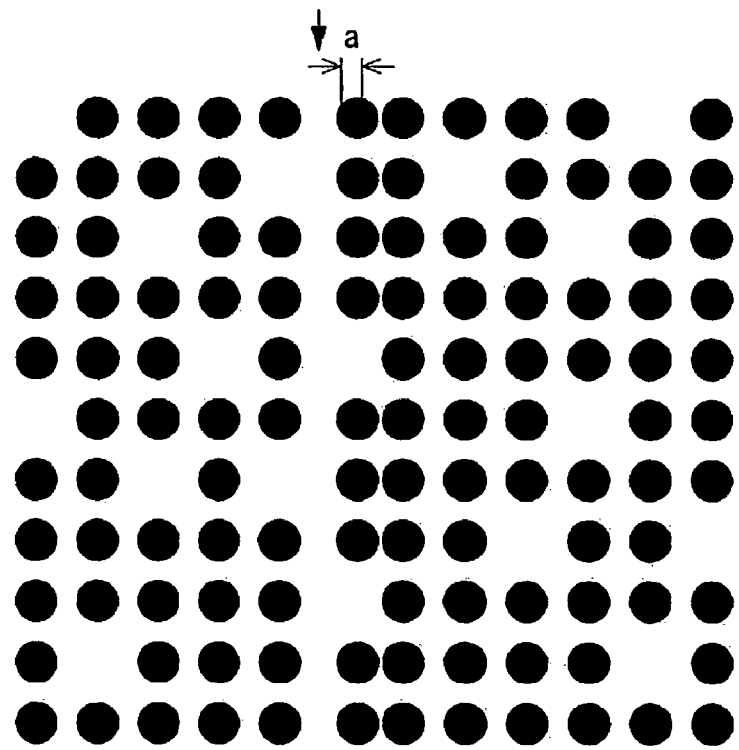
FIG. 8B is a diagram illustrating an example of a dot pattern formed when a nozzle of the cyan nozzle module causes a flying curve to occur.
Figure 9A:
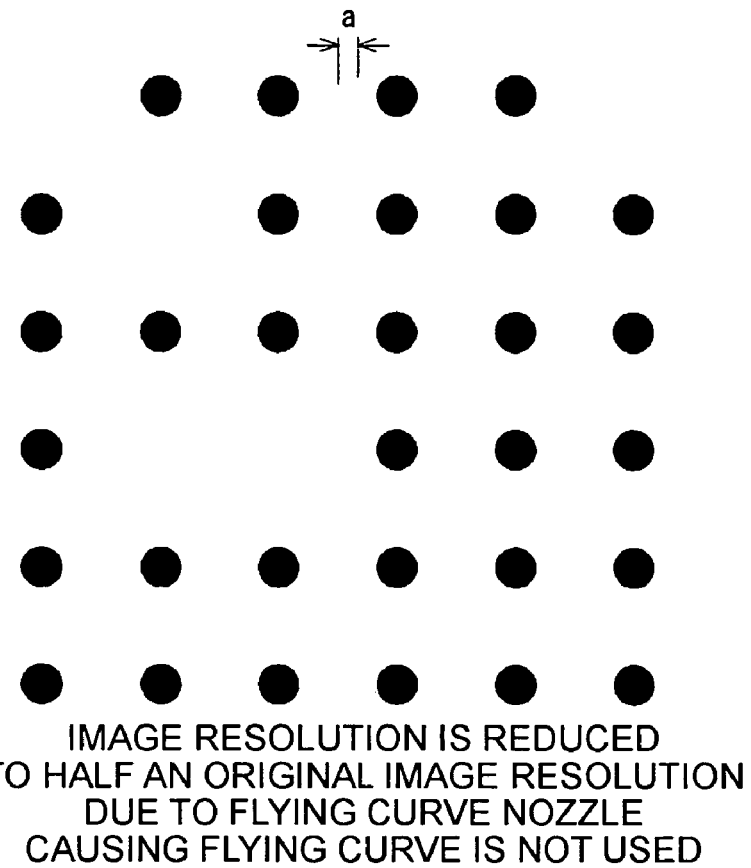
FIG. 9A is a diagram illustrating an example of a dot pattern formed when the nozzle of the cyan nozzle module is not used and a resolution is half the original resolution.
Figure 9B:
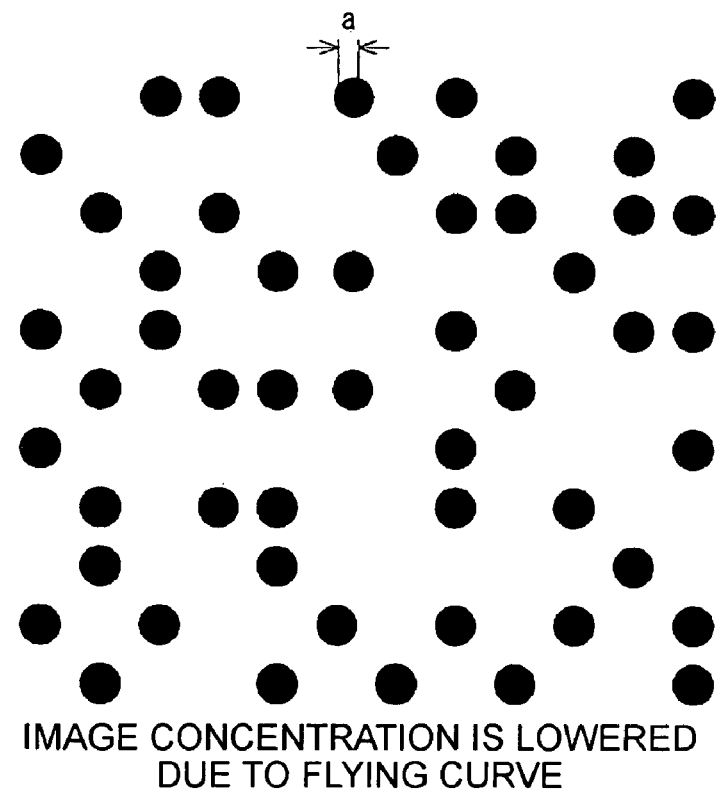
FIG. 9B is a diagram illustrating an example of a dot pattern formed by reducing an ink ejecting amount of the abnormal nozzles including the nozzle of the cyan nozzle module.
Figure 13:
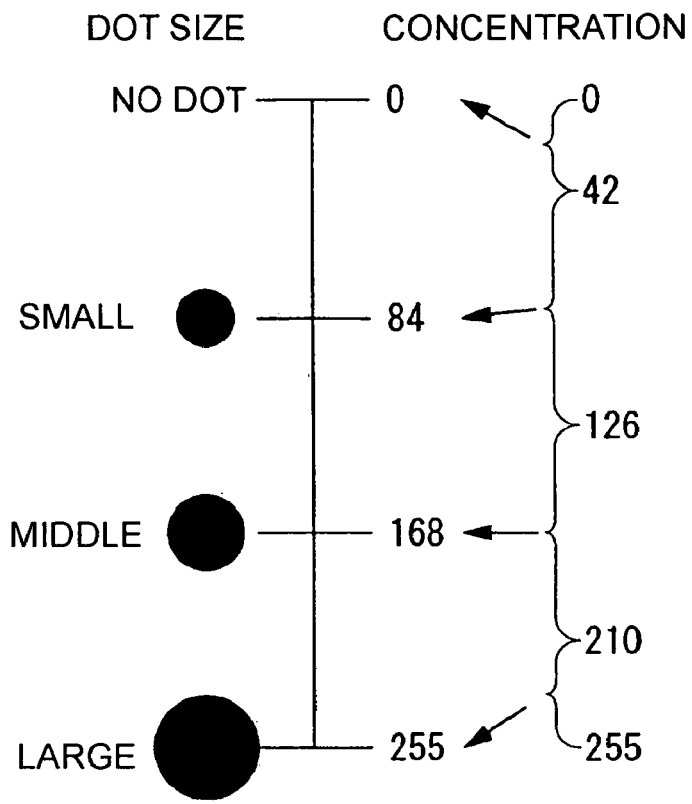
FIG. 13 is a diagram illustrating an example of information of an N value with respect to a dot size and an example of information of a threshold value with respect to each N value.
Figure 14:
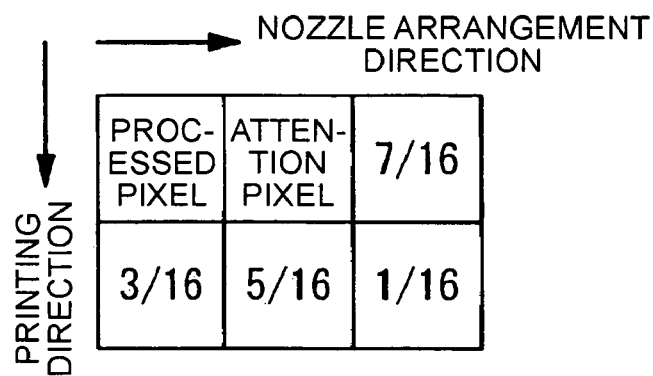
FIG. 14 is a diagram illustrating an example of an error spread matrix used for an N-value conversion process.

FIG. 8A is a diagram illustrating an example of a dot pattern formed by a cyan nozzle module 56 in which there is no abnormal nozzle that causes a so-called flying curve phenomenon to occur, and FIG. 8B is a diagram illustrating an example of a dot pattern formed when a nozzle N6 of the cyan nozzle module 56 causes a flying curve phenomenon to occur. FIG. 9A is a diagram illustrating an example of a dot pattern in a case in which the nozzle N6 of the cyan nozzle module 56 is not used and the dot pattern is formed with a resolution of ½ of the original resolution, and FIG. 9B is a diagram illustrating an example of a dot pattern formed by reducing an ink ejection amount of each of abnormal nozzles including the nozzle N6 of the cyan nozzle module 56. FIG. 10A is a diagram illustrating an information table which indicates a relative flying curve amount of each nozzle, and FIG. 10B is a diagram illustrating an information table indicating whether the respective nozzles have ejected ink and included in nozzle information. FIG. 11A is a diagram illustrating an example of an image which is formed by nozzles corresponding to the respective colors of CMYK including abnormal nozzles and obtained before changing a color ratio, and FIG. 11B is a diagram illustrating an example of an image obtained after changing the color ratio of FIG. 11A. FIG. 12 is a diagram illustrating an information table showing a mixed ratio for each color which is included in the color ratio information and can prevent banding. FIG. 13 is a diagram illustrating an example of each of information of an N value with respect to a dot size and information of a threshold value with respect to each N value. FIG. 14 is a diagram illustrating an example of an error spread matrix used for an N-value conversion process.

As shown in FIG. 8A, in the dot pattern formed by the cyan nozzle module 56 in which there is no abnormal nozzle causing the flying curve phenomenon to occur, as described above, banding, such as 'white stripes' or 'thick stripes', which is caused by the variation between the nozzle intervals, does not occur.

In the meantime, as shown in FIG. 8B, according to the printing result by the cyan nozzle module 56 including the abnormal nozzle causing the flying curve to occur, the dots formed by the abnormal nozzle N6 are shifted to the dots formed by a normal nozzle N7 adjacent to the nozzle N6 in a right direction by a distance a. As a result, there occur 'white stripes' between the dots formed by the nozzle N6 and the dots formed by the nozzle N5 adjacent to the nozzle N6 in a left direction.

In addition, although not shown, there is a case in which due to the nozzle N6 of the cyan nozzle module 56 having an ink ejection failure (non-ejection), the dots, which should be formed, are not formed, and 'white stripes' occurs between the dots formed by the nozzle N5 and the nozzle N7.

The above-mentioned 'white stripe' is a so-called printing material 'coated over an entire surface'. When concentrations extremely different from each other are combined like a case in which the printing paper is white and ink is black, the white stripes may be strikingly seen, which results in deteriorating a quality of the printing material extremely.

In addition, as described above, the nozzle N6 is shifted by the distance d because of the flying curve, so that the distance between the nozzle N6 and the nozzle N7 adjacent to the nozzle N6 in the right direction becomes smaller by the distance a. As a result, the density of the dots formed by the nozzles N6 and N7 increases (the dots may overlap each other), and the corresponding portion becomes 'thick stripes' so as to be seen by people. Due to this, the quality of the printing material may be extremely deteriorated.

In this case, in order to prevent the banding such as 'white stripes' or 'thick stripes' from occurring, a method in which as shown in FIG. 9A, the abnormal nozzle N6 is not used (the dots are not formed), and the resolution of the image formed by the abnormal nozzle is changed to half the resolution before changing the resolution shown in FIG. 8B (as a result, the number of formed dots is reduced) and a method in which as shown in FIG. 9B, the entire ink ejection amount of the abnormal nozzle N6 (the number of formed dots) is reduced while using the abnormal nozzle N6, are very effective in apprehending dot patterns shown in FIGS. 9A and 9B.

However, as described above, if the number of dots formed by the abnormal nozzle (cyan nozzle) (ink ejection amount) is reduced so as to prevent the banding from occurring, the banding itself can be prevented from occurring, but since the balance of the mixed ratio of the color before reducing the number of dots formed by the abnormal nozzle, which is obtained through the mixture with the other colors, may collapse, the color obtained before reducing the number of dots formed by the abnormal nozzle may be changed to another color obtained after reducing the number of dots formed by the abnormal nozzle. This is applicable to a case in which a dot forming size is reduced. That is, if the dot forming size is reduced (an ink ejection amount is reduced), the concentration of the corresponding color may be lowered, so that the balance of the mixed ratio of the color may be collapsed.

Accordingly, in the printing device 100 according to the embodiment of the invention, a value of the pixel data of the color corresponding to the abnormal nozzle in the CMYK image data is changed such that the ink ejection ratio of the abnormal nozzle becomes the ratio which is capable of preventing the banding from occurring, and a value of the pixel data corresponding to another nozzle related to the abnormal nozzle in the CMYK image data is changed in accordance with the value obtained by changing the pixel value corresponding to the abnormal nozzle such that the color, which is formed with the color of the ink ejected by the abnormal nozzle and the color of the ink ejected by each of the other nozzles before changing the value of the pixel data, is within a range of the same color even after changing the value of the pixel data. As a result, the second image data is created. The second image data is subjected to the N-value conversion process, so that the printing data, which can prevent or reduce the banding from occurring and can resolve the above-mentioned problems, is created.

First, in the printing device 100, if the image data acquiring unit 10 receives printing instruction information from the external device or the like (step S100), it acquires the first image data corresponding to the printing instruction information from the external device serving as a transmitting source of the printing instruction information, and then transmits the CMYK image data obtained by converting color information of the acquired first image data (RGB) into CMYK to the second image data creating unit 11 (step S102). If the second image data creating unit 11 acquires the CMYK image data from the image data acquiring unit 10, it executes the second image data creating process (step S104).

When the color ratio changing unit 11a acquires the CMYK image data transmitted from the image data acquiring unit 10, the second image data creating process starts (step S200). According to the second image data creating process, first, the color ratio changing unit 11a reads the nozzle information from the nozzle information storing unit 11b, and stores the read nozzle information in a predetermined region of the RAM 62 (step S202). Next, the color ratio changing unit 11a reads the color ratio information from the color ratio information storing unit 11c, and stores the read color ratio information in a predetermined region of the RAM 62 (step S204).

In addition, if the color ratio changing unit 11a acquires the nozzle information and the color ratio information, it selects one by one the nozzle information corresponding to a non-process nozzle module from the nozzle information corresponding to the nozzle modules 50, 52, 54, and 56 corresponding to ink of each of the CMYK (step S206). In the present embodiment, the nozzle information has a type of a data table for each nozzle module, and information, which shows a relative flying curve amount with respect to a number of each of the nozzles constituting the corresponding nozzle module, is prepared as a table for each nozzle module. That is, if the cyan ink is exemplified, in the data table, a relative flying curve amount (relative ejection precision information) is associated with the number of each of nozzles constituting the cyan nozzle module, as shown in FIG. 10B.

Further, if the color ratio changing unit 11a selects the data table with respect to the nozzle module, it selects a non-process nozzle number in the data table (step S208), and determines whether the selected nozzle is related to the banding based on information indicating a relative flying curve amount corresponding to the selected nozzle number (step S210). In the present embodiment, when the relative flying curve amount of the selected nozzle is not less than a predetermined threshold value (for example, 4 µm), it is determined by the color ratio changing unit 11a that the selected nozzle is related to the banding (the branch of (Yes) of step S210). In contrast, when the relative flying curve amount of the selected nozzle is smaller than a predetermined threshold value, it is determined by the color ratio changing unit 11a that the selected nozzle is not related to the banding (the branch of (No) of step S210).

Hereinafter, a process executed when it is determined that the selected nozzle is related to the banding will be described.

When the selected nozzle is related to the banding, first, the color ratio changing unit 11a selects the pixel data related to the selected nozzle from the first image data (step S212), and analyzes the color mixed ratio of the corresponding pixel data (step S214). Here, the pixel data related to the selection nozzle is the pixel data which corresponds to the above-mentioned abnormal nozzles (eleven nozzles) and other nozzles related to the printing of the image portion corresponding to the abnormal nozzles.

For example, in a case in which the flying curve occurs in the nozzle N6 of the cyan nozzle module 56, as described above, if it is assumed that the number of abnormal nozzles is totally eleven (nozzles N1 to N11), that is, the five abnormal nozzles are disposed at each of left and right sides of the nozzle N6, the pixel data corresponding to the abnormal nozzles (nozzles N1 to N11) becomes the pixel data related to the printing of the image portion corresponding to the abnormal nozzles, for example, the pixel data corresponding to nozzles N1 to N11 of the black nozzle module 50, nozzles N1 to N11 of the yellow nozzle module 52, and nozzles N1 to N11 of the magenta nozzle module 54.

Further, the color mixed ratio analyzing process is a process that calculates what percentage of a maximum ejection amount an ink ejection amount of each color of the nozzles N1 to N11 is from the pixel value of the pixel data corresponding to the nozzles N1 to N11 of each of the nozzle modules 50, 52, 54, and 56.

According to the color mixed ratio analyzing process, for example, as shown in FIG. 11A, the color mixed ratio of the cyan nozzle is b 50%, the color mixed ratio of the magenta nozzle is 90%, the color mixed ratio of the yellow nozzle is 40%, and the color mixed ratio of the black nozzle is 10%.

The characteristic of the CMYK ink used in the present embodiment will be described in detail.

In a general printing device, basically, ink corresponding to each of three colors including C (cyan), M (magenta), and Y (yellow) is prepared, and full color display is achieved by changing the printing ratio of the three colors. Further, in addition to the CMY, ink corresponding to K (black) is used so as to improve a printing quality, and printing is performed based on CMYK.

For example, when the ink corresponding to each of the four colors of CMYK is used and the printing is performed with 100% for each color, ink of total 400% corresponding to 100%×4 is printed on the paper. In a case in which one color is printed, then a printing mode enters a standby mode until the printed ink is dried, and then a next color is printed, even if the ink of 400% is printed on the paper, it does not cause a problem. For example, in a high-speed offset rotary press, the ink is gradually disposed on the paper in a wet state and a total amount, so that it becomes rapidly difficult for the ink to be disposed on the paper from a point of time when a total ink amount having been disposed on the paper exceeds 300%. Due to this, when another ink disposed subsequent to the disposed ink has high viscosity, the ink having already been disposed on the paper may be removed.

In addition, even in the case of an inkjet type, if a portion having the high concentration, such as, for example, a shadow portion, is represented by ink of three colors of CMY, the impacting amount in a state in which the three colors overlap each other increases, and the total amount of the ink of the corresponding portion increases. As a result, the ink absorptance of the paper becomes deteriorated and the paper becomes sticky, which results in entering a ruffed state. Accordingly, in a general inkjet printer or the like, the CMY ink of the high concentration portion is replaced with the black (K) ink, a total amount of the ink of four colors of CMYK is reduced, and the paper where the ink has been disposed is prevented from being sticky. This method is generally called an UCR (under color removal).

In the present embodiment, under consideration of the under color removal, based on the acquired color ratio information, with respect to the four colors of CMYK, the color mixed ratio is changed in accordance with the relationships shown in the following Equations 1 and 2. However, actually, each ink has complex influence, so that the color mixed ratio cannot be changed in accordance with the simple Equations 1 and 2. In the actual process, instead of the simple Equations 1 and 2, a conversion equation having been considered the ink characteristics may be used. In the present embodiment, for convenience of description, the color ratio changing process will be described by using the following Equations 1 and 2.

$$(C1, M1, Y1, K1) \rightarrow (C2, M2, Y2, K2) \quad (1)$$

$$C1+K1=C2+K2,\ M1+K1=M2+K2,\ Y1+K1=Y2+K2 \quad (2)$$

In this case, C1, M1, Y1, and K1 are ink ejection ratios of cyan, magenta, yellow, and black before performing the color ratio change, respectively, and C2, M2, Y2, and K2 are ink ejection ratios of cyan, magenta, yellow, and black after performing the color ratio change, respectively.

As shown in FIG. 12, the color ratio information includes an information table in which a maximum ejection ratio capable of preventing the banding from occurring is associated with each color of CMYK. That is, as shown in FIG. 12, the pixel value of the pixel data corresponding to each nozzle in the first image data is changed such that when the nozzle corresponding to the cyan ink is related to the banding, an ejection ratio of the corresponding cyan ink nozzle becomes 30% at the maximum, when the nozzle corresponding to the magenta ink is related to the banding, an ejection ratio of the corresponding magenta ink nozzle becomes 30% at the maximum, when the nozzle corresponding to the yellow ink is related to the banding, an ejection ratio of the corresponding yellow ink nozzle becomes 60% at the maximum, and when the nozzle corresponding to the black ink is related to the banding, an ejection ratio of the corresponding black ink nozzle becomes 20% at the maximum. In addition, the amount reduced by changing the pixel value of the pixel data is compensated by changing the ink ejection ratio of the nozzle corresponding to another color.

In this case, as described above, since the nozzle corresponding to the cyan ink is related to the banding in FIG. 11A, the pixel value of the pixel data in the first image data, which corresponds to a place where the banding occurs, is changed such that the banding is prevented from occurring or reduced, for example, an ejection ratio 50% of the cyan ink before changing the ejection ratio of the cyan ink is changed to the maximum ratio 30% capable of preventing the banding from occurring, as shown in FIG. 12.

In addition, the reduce amount 20% of the ejection ratio of the cyan ink having been reduced from 50% to 30% is compensated by changing the pixel value of the pixel data corresponding to the abnormal nozzle in the first image data such that an ejection amount of the black ink is increased from 10% before the change to 30% by 20% in accordance with Equations 1 and 2, and the pixel value of the pixel data corresponding to the abnormal nozzle in the first image data is changed such that an ink ejection amount of each of the magenta and the yellow affected by increasing the ejection amount of the black ink by 20% is reduced by 20% (step S216).

Specifically, the pixel value is changed with respect to the cyan ink related to the banding such that the relationship of C1+K1=C2+K2 is satisfied in Equation 2, that is, K2=30% is obtained from the relationship of 50+10=30+K2. In the same manner, the pixel value is changed with respect to the magenta ink affected by setting K2 to 30% such that the relationship of M1+K1=M2+K2 is satisfied in Equation 2, that is, M2=70% is obtained from the relationship of 90+10=M2+30. In the same manner, the pixel value is changed with respect to the yellow ink affected by setting K2 to 30% such that the relationship of Y1+K1=Y2+K2 is satisfied in Equation 2, that is, Y2=0% is obtained from the relationship of 20+10=Y2+30.

In this way, the pixel value of the pixel data corresponding to the nozzle related to the banding and the nozzle of another color related to the nozzle is changed so as to become the above-mentioned color mixed ratio, so that created is the second image data which can form a printing image capable of maintaining the color before the change within a range of the same color and preventing or reducing the banding, as shown in FIG. 11B.

In addition, in the above-mentioned example, since the ejection ratio of the yellow ink is 20%, the ink ejection ratio of the nozzle related to the banding cannot be reduced to 25% or less. However, when the colors are constructed with the color mixed ratio of (C1, M1, Y1, and K1)=(50%, 30%, 15%, and 10%) and the magenta nozzle used in constructing the corresponding color is related to the banding, the color mixed ratio can be changed such that the above-mentioned color mixed ratio becomes (C2, M2, Y2, and K2)=(45%, 25%, 10%, and 15%) in accordance with Equations 1 and 2. Thereby, the ejection ratio of the magenta ink can become 25%, that is, a quarter of the maximum ejection ratio or less. In this case, even if the printing resolution of the magenta is the half the original resolution, since the colors can be constructed, the nozzles causing the banding to occur, that is, nozzles causing the flying curve and the nozzles having an ejection failure, in which the ink ejection amount is different from an ideal ink ejection amount, may be not used.

In addition, the determination whether the nozzle has an ejection failure is made based on a table in which information indicating whether ink is ejected (0 at the time of normal ejection and 1 at the time of non-ejection) is associated with a nozzle number of each of the nozzles constituting the magenta nozzle module, as shown in FIG. 10B.

In the present embodiment, with respect to the pixel data corresponding to the nozzle causing the banding in the magenta nozzle module, information which instructs the corresponding nozzle not to be used (information which instructs the dots not to be used) is added, and with respect to the pixel data corresponding to the abnormal nozzle, information which instructs the printing resolution in the N-value conversion processing unit 12 to be half the original resolution is added.

The above-mentioned determination process is performed with respect to all the nozzles in all the nozzle modules in the printing head 200, and with respect to the nozzles having been determined that the corresponding nozzles are related to the banding, the pixel value of the pixel data corresponding to the abnormal nozzles including the corresponding nozzle and the nozzles related to the abnormal nozzles in the CMYK image data is changed such that the banding can be prevented or reduced and the color mixed ratio is within the same color range as the color before the change, so that the second image data is created. The created second image data is transmitted to the printing data creating unit 12, and the printing data creating process is executed in the printing data creating unit 12 (step S106).

The printing data creating process starts by determining whether the N-value conversion processing unit 12a has acquired the second image data transmitted from the second image data creating unit 11 (step S300). First, the N-value conversion processing unit 12a reads out the N-value conversion information from the N-value conversion information storing unit 11b to store the read N-value conversion information in a predetermined region of the RAM 62, and acquires the N-value conversion information (step S302). Here, as described above, the N-value conversion information includes a threshold value and a concentration value corresponding to each dot forming size information so as to perform an N-value conversion process.

If the N-value conversion processing unit 12a acquires the N-value conversion information, it selects the pixel data where the N-value conversion process is not performed in the second image data based on the N-value conversion information (step S304), and performs the N-value conversion process on the selected pixel data (step S306).

In the present embodiment, the N-value conversion process is as follows. In a case in which the original pixel value of the selected pixel data (concentration value or luminance value) is a 8-bit (256) gray-scale level, for example, if the pixel value is the concentration value, as shown in FIG. 13, when the original pixel value is less than a value within a range of (0) to (42), the corresponding pixel value is set to (0), the corresponding N value is set to (0) (the dot is not formed), when the original pixel value is less than a value within a range of (42) to (126), the corresponding pixel value is set to (84), the corresponding N value is set to (1) (the dot is formed) with respect to a small-sized dot, when the original pixel value is less than a value within a range of (126) to (210), the corresponding pixel value is set to (168), the corresponding N value is set to (1) (the dot is formed) with respect to a middle-sized dot, and when the original pixel value is less than a value within a range of (210) to (255) (it may be 255 or more), the corresponding pixel value is set to (255), the corresponding N value is set to (1) with respect to a large-sized dot.

In addition, the above-mentioned example corresponds to a case using the concentration as the pixel value. Alternatively, when using the luminance as the pixel value, a value opposite to the concentration is taken with respect to the dot of each size.

In the present embodiment, by the N-value conversion process, the data of the gray-scale direction of the image is converted into a gray-scale direction and an area gray-scale level for every color of CMYK according to the performance of the ink ejection mechanism. As shown in FIG. 13, as an example of the performance of the ink ejection mechanism, if the printing can be performed by the three kinds of dot forming sizes, four gray-scale display can be made with respect to each ink, including a state in which the dots are not formed. That is, the four gray scale levels and area gray-scale levels are mixed with each other so as to reproduce a full gray-scale level. When the dot size is restricted to only one kind, two gray-scale levels indicating whether the dots are formed or not and the area gray-scale levels are mixed so as to reproduce a full gray-scale level.

In addition, as a technical method of controlling the dot size, in a case of a type in which a piezoelectric element (piezo actuator) is used in a printing head, the ink ejection amount is controlled by changing a voltage applied to the piezoelectric element, so that the dot size can be easily controlled.

If the N-value conversion process is performed with respect to the selected pixel data, the error between the luminance value of the selected pixel data before the N-value conversion process and the luminance value corresponding to a dot number after the N-value conversion process is calculated, and an error spread process, which spreads the calculated error to the pixel where the N-value conversion process at the periphery of the pixel of the selected pixel data is not performed based on the error spread matrix illustrated in FIG. 14, is performed (step S308).

The error spread process is the same as the error spread process according to the related art. For example, if the binarization process is exemplified, in a case in which the attention pixel becoming the process subject can be represented with eight bits (256 gray-scale levels) and the gray-scale level of the attention pixel is (101), since the gray-scale level thereof does not satisfy (128) being the threshold value (middle value) in the general binarization process, the process is performed as (0), that is, the pixel where the dot is not formed, and (101) is discarded as it is. In the meantime, in a case of the error spread process, since the (101) is spread to the peripheral non-process pixel in accordance to the predetermined error spread matrix, for example, the value of the pixel adjacent to the selected pixel in the right side does not satisfy the same threshold value as the selected pixel by only the binarization process, the process that (the dot is not formed) may be performed. However, the concentration value exceeds the threshold value by receiving the error of the selected pixel, so that the process that the dot is formed may be performed. Therefore, it is possible to obtain the binarization data similar to the original image data.

That is, since the concentration value for each dot forming size is used in the error spread process, the difference between the concentration value of the original pixel data and the concentration value of the corresponding dot size after performing the N-value conversion process is spread to the peripheral non-process pixel data as the error.

In addition, as described above, when the information indicating that the nozzle causing the banding is not used and the information indicating that the resolution is set to half the original resolution are added to the selected pixel data in the second image data, in the N-value conversion process, the selected pixel data is unconditionally converted into a nozzle number (0), and the error thereof is spread to the peripheral pixel. In addition, with respect to the pixel data corresponding to the abnormal nozzle including the selected pixel data, the N-value conversion process is performed such that the pixel data includes the selected pixel data and the dot is not formed with the resolution of half the original resolution.

In addition, if the N-value conversion process is completed with respect to all of the pixel data in the second image data (step S310), the N-value conversion processing unit 12 sets the second image data having been subjected to the N-value conversion process and the error spread process to the printing data, and outputs the corresponding printing data to the printing unit 13 (step S108).

In addition, using the printing head 200, the printing unit 13 forms (prints) the dot on the recording medium with the color mixed ratio according to the second image data based on the printing data output from the printing data creating unit 12 (step S110). As shown in FIGS. 9A and 9B, according to the dot forming result, the dot forming pattern corresponding to the nozzle of the color related to the banding becomes the pattern having the ink ejection ratio capable of preventing the banding from occurring. As shown in FIG. 8B, in a case in which the dot forming result is compared with the dot forming result when the general printing data is created so as to see a macro-viewpoint without considering a state in which the flying curve occurs in the nozzle N6 (the above-mentioned color ratio changing process is not performed), the definition deterioration such as roughness may occur, as compared with the ideal printing result of FIG. 8A. However, the phenomenon recognized as the white stripe or thick stripe is not visually observed by the user, so that it is possible to improve the definition as a whole.

In the first embodiment, the image data acquiring unit 10 corresponds to the image data acquiring unit according to any one of the first to fifth aspects, the second image data creating unit 11 corresponds to the second image data creating unit according to any one of the first to fifth aspects, the printing data creating unit 12 corresponds to the printing data creating unit according to any one of the first to fifth aspects, and the printing unit 13 corresponds to the printing unit according to the first aspect.

In the first embodiment, step S102 corresponds to the acquiring of the image data according to any one of the second to seventh aspects, step S104 corresponds to the creating of the second image data according to any one of the second to eighth aspects, step S106 corresponds to the creating of the printing data according to any one of the second to eighth aspects, and step S110 corresponds to the printing according to the second or fourth aspect.

Second Embodiment

Figure 15:
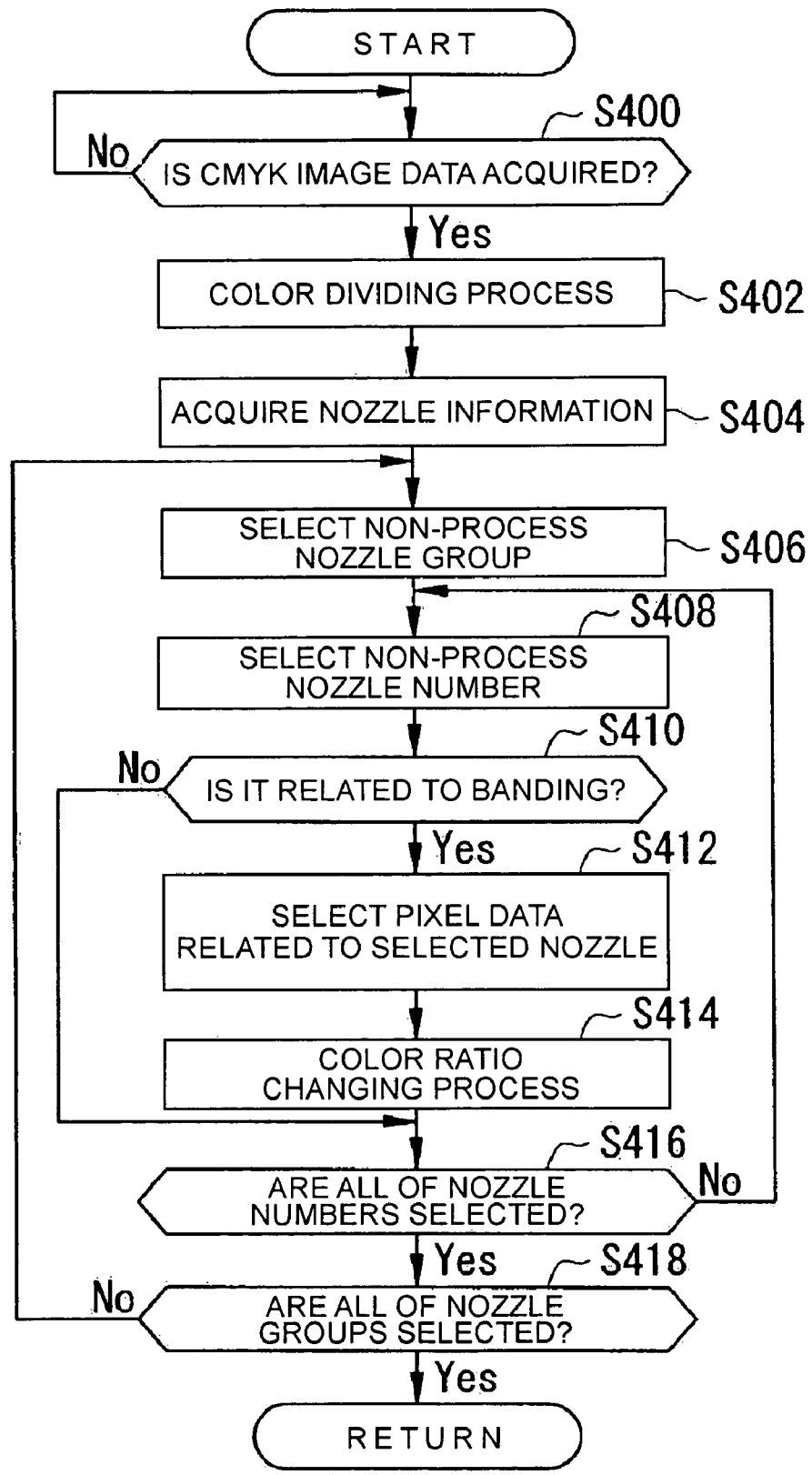
FIG. 15 is a flowchart illustrating a second image data creating process in a second image data creating unit of a printing device according to a second embodiment of the invention.

Next, a second embodiment of the invention will be described with reference to the accompanying drawings. FIGS. 15 and 17 are diagrams illustrating a printing device, a program for controlling a printing device, a method of controlling a printing device, a printing data creating device, a program for creating printing data, and a method of creating printing data according to a second embodiment of the invention.

In the second embodiment, a structure of each of a printing device and a computer system is the same as that of the first embodiment illustrated in FIGS. 1 and 2. However, in the second embodiment, the printing head 200 has a structure in which it has, in addition to the nozzle modules of the four colors of CMYK, nozzles modules corresponding to two colors, that is, LC (light cyan) and LM (light magenta). In this case, the LC is the same color as the cyan, except for saturation, and the LM is the same color as the magenta, except for saturation. In addition, in the second embodiment, the second image data creating process performed in step S104 of FIG. 5 in the first embodiment is changed to the second image data creating process performed in steps of FIGS. 15 and 16.

Figure 16:
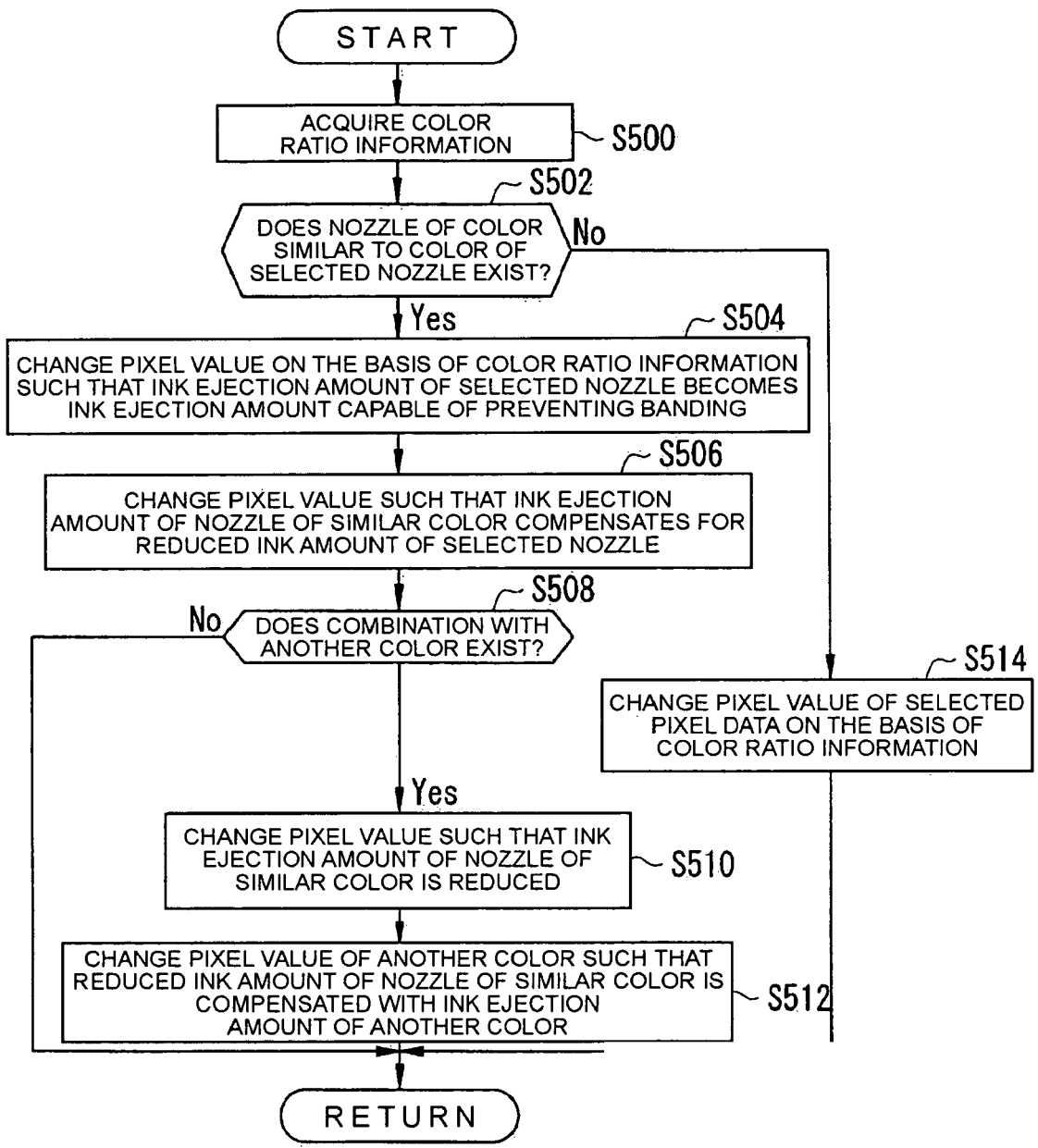
FIG. 16 is a flowchart illustrating a color ratio conversion process having considered light cyan in the second image data creating unit of the printing device according to the second embodiment of the invention.

The second image data creating process of FIGS. 15 and 16 has the same data creating principle as the first embodiment. However, the second image data creating process according to the second embodiment is different from that of the first embodiment in that by adding the two colors of the light cyan and the light magenta, when the nozzles related to the cyan and the light cyan are related to the banding, the interpolation is performed between the similar colors, and in the same manner, when the nozzles related to the magenta and the light magenta are related to the banding, the interpolation is performed between the similar colors.

Hereinafter, only a portion of the second embodiment different from the first embodiment will be described, and the description of a portion overlapping the description of the first embodiment will be omitted.

The second image data creating process in step S104 in the second embodiment will be described in detail based on FIG. 15.

FIG. 15 is a flowchart illustrating a second image data creating process in the second image data creating unit 11 of the printing device 100.

The second image data creating process is a process in which the color mixed ratio of the pixel data corresponding to the plurality of colors of nozzles including the nozzles related to the banding and the nozzle of the color similar to the color of the nozzles related to the banding are changed based on the color mixed ratio between the color of the nozzles related to the banding and the color of the nozzle of the color similar to the color of the nozzles related to the banding such that the corresponding color is within a range of the same color as the color before changing the color mixed ratio and the changed color mixed ratio becomes the color mixed ratio capable of preventing or reducing the banding. If the second image data creating process is executed in step S104, first, the process proceeds to step S400, as shown in FIG. 15.

In step S400, the color ratio changing unit 11a determines whether the CMYK image data has been acquired from the image data acquiring unit 10. In this case, if it is determined by the color ratio changing unit 11a that the CMYK image data has been acquired from the image data acquiring unit 10 (Yes), the process proceeds to step S402. In contrast, if it is determined by the color ratio changing unit 11a that the CMYK image data has not been acquired from the image data acquiring unit 10 (No), the determination process is repeated until the CMYK image data is acquired. When the process proceeds to step S402, the color ratio changing unit 11a performs a color dividing process on the CMYK image data such that the color is divided into the six colors of the CMYK and the LC and LM, thereby creating the second CMYK image data. Then, the process proceeds to step S404.

In step S404, the color ratio changing unit 11a reads out the nozzle information from the nozzle information storing unit 11b, stores the read nozzle information in a predetermined region of the RAM 62, and acquires the nozzle information. Then, the process proceeds to step S406.

In step S406, the color ratio changing unit 11a selects the nozzle information of the non-process nozzle module from the nozzle information acquired in step S404, and the process proceeds to step S408.

In step S408, the color ratio changing unit 11a selects the nozzle information corresponding to a non-process nozzle number from the nozzle information of the non-process nozzle module selected in step S406, and the process proceeds to step S410.

In step S410, the color ratio changing unit 11a determines whether the corresponding nozzle is related to the banding based on the nozzle information of the non-process nozzle number (hereinafter, referred to as a selected nozzle number) selected in step S408, and if it is determined by the color ratio changing unit 11a that the corresponding nozzle is related to the banding (Yes), the process proceeds to step S412. In contrast, if it is determined by the color ratio changing unit 11a that the corresponding nozzle is not related to the banding (No), the process proceeds to step S416.

When the process proceeds to step S412, the color ratio changing unit 11a selects pixel data related to a nozzle of the selected nozzle number from the second CMYK image data, and the process proceeds to step S414.

In step S414, the color ratio changing unit 11a executes the color ratio changing process on the pixel data selected in step S412, and the process proceeds to step S416.

In step S416, the color ratio changing unit 11a determines whether all of the nozzle numbers with respect to the selected nozzle module has been selected. In this case, if it is determined by the color ratio changing unit 11a that all of the nozzle numbers with respect to the selected nozzle module has been selected (Yes), the process proceeds to step S418. In contrast, if it is determined by the color ratio changing unit 11a that all of the nozzle numbers with respect to the selected nozzle module has not been selected (No), the process proceeds to step S408.

When the process proceeds to step S418, the color ratio changing unit 11a determines whether all of the nozzle modules has been selected. In this case, if it is determined by the color ratio changing unit 11a that all of the nozzle modules have been selected (Yes), a series of processes are completed, and the process returns to the original process. In contrast, if it is determined by the color ratio changing unit 11a that all of the nozzle modules have been not selected (No), the process proceeds to step S406.

Further, the color ratio changing process of step S414 will be described in detail with reference to FIG. 16.

FIG. 16 is a flowchart illustrating a color ratio changing process having considered the light cyan in the second image data creating unit 11 of the printing device 100.

The color ratio changing process is a process in which when the nozzles related to the banding are the nozzles corresponding to the light cyan, the color mixed ratio of the pixel data corresponding to the plurality of colors of nozzles including these nozzles are changed based on the ink ejection amount of light cyan and the ink ejection amount of cyan similar to the light cyan such that the corresponding color is within a range of the same color as the color before changing the color mixed ratio and the changed color mixed ratio becomes the color mixed ratio capable of preventing or reducing the banding. If the color ratio changing process is executed in step S414, first, the process proceeds to step S500, as shown in FIG. 16.

In step S500, the color ratio changing unit 11a reads out the color ratio information from the color ratio information storing unit 11c, stores the read color ratio information in a predetermined region of the RAM 62, and acquires the color ratio information. Then, the process proceeds to step S502.

In step S502, the color ratio changing unit 11a determines whether a nozzle of the similar color to the color of the selected nozzle exists. In this case, if it is determined by the color ratio changing unit 11a that a nozzle of the similar color to the color of the selected nozzle exists (Yes), the process proceeds to step S504. In contrast, if it is determined by the color ratio changing unit 11a that a nozzle of the similar color to the color of the selected nozzle does not exist (No), the process proceeds to step 514.

In step S504, the color ratio changing unit 11a changes the pixel value of the pixel data corresponding to the selected nozzle based on the color ratio information such that the ink ejection amount of the selected nozzle becomes the ink ejection amount capable of preventing or reducing the banding. Then, the process proceeds to step S506.

In step S506, the color ratio changing unit 11a changes the pixel value of the pixel data corresponding to the nozzle of the corresponding similar nozzle such that the ink ejection amount of the nozzle of the similar color to the color of the ink of the selected nozzle (hereinafter, referred to as similar color nozzle) compensates for the ink ejection amount of the selected nozzle reduced in step S504. Then, the process proceeds to step S508.

In step S508, the color ratio changing unit 11a determines whether the combination with another color is necessary from the view point of granularity. In this case, if it is determined by the color ratio changing unit 11a that the combination with another color is necessary (Yes), the process proceeds to step S510. In contrast, if it is determined by the color ratio changing unit 11a that the combination with another color is not necessary (No), a series of processes are completed, and the process returns to the original process.

When the process proceeds to step S510, the color ratio changing unit 11a changes the pixel value of the pixel data corresponding to the nozzle of the corresponding similar nozzle such that the ink ejection amount of the nozzle of the similar color to the color of the ink of the selected nozzle is reduced. Then, the process proceeds to step S512.

In step S512, the color ratio changing unit 11a changes the pixel value of the pixel data corresponding to the nozzle of another color such that the ink ejection amount of the nozzle of the similar color to the color of the ink of the selected nozzle is compensated with the ink ejection amount of the nozzle of another color. A series of processes are completed, and the process returns to the original process.

In step S508, when it is determined that the nozzle of the similar color to the color of the selected nozzle does not exist and the process proceeds to step S514, the same process as step S216 of the first embodiment is performed based on the color ratio information. Then, a series of processes are completed, and the process returns to the original process.

Next, the operation of the second embodiment will be described with reference to FIG. 17.

FIG. 17 is a diagram illustrating an example of a color ratio changing process course in a case in which a nozzle corresponding to light cyan is related to banding.

In the present embodiment, although not shown, similarly to FIG. 8B of the first embodiment, 'white stripes' or 'thick stripes', which are caused by the flying curve of the nozzle, occur in the dot pattern formed by the light cyan nozzle.

In the present embodiment, when the color ratio changing unit 11a acquires the CMYK image data transmitted from the image data acquiring unit 10, the second image data creating process starts (step S400). First, the color ratio changing unit 11a divides the CMYK of the acquired CMYK image data into six colors including the CMYK and the LC and LM so as to create the second CMYK image data (step S402). Next, the color ratio changing unit 11a reads out the nozzle information from the nozzle information storing unit 11b, and stores the read nozzle information in a predetermined region of the RAM 62 (step S404).

In addition, if the color ratio changing unit 11a acquires the nozzle information, it selects one by one the nozzle information corresponding to a non-process nozzle module where the second image data creating process is not performed from the nozzle information corresponding to the nozzle modules corresponding to ink of the CMYK and the LC and LM (step S406). In the present embodiment, the nozzle information has the same type as a data table shown in FIG. 10A in the first embodiment.

Further, if the color ratio changing unit 11a selects the data table with respect to the selected nozzle module, it selects a non-process nozzle number in the data table (step S408), and determines whether the selected nozzle is related to the banding based on information indicating a relative flying curve amount of each table corresponding to the selected nozzle number (step S410). In the present embodiment, similarly to the first embodiment, when the relative flying curve amount of the selected nozzle is not less than a predetermined threshold value (for example, 4 μm), it is determined by the color ratio changing unit 11a that the selected nozzle is related to the banding (the branch of (Yes) of step S410). In contrast, when the selected nozzle performs the normal ejection and the relative flying curve amount of the selected nozzle is smaller than a predetermined threshold value, it is determined by the color ratio changing unit 11a that the selected nozzle is not related to the banding (the branch of (No) of step S410).

Hereinafter, a process executed when it is determined that the selected nozzle is related to the banding will be described.

When the selected nozzle is related to the banding, first, the color ratio changing unit 11a selects the pixel data related to the selected nozzle from the first image data (step S412), and determines whether a nozzle corresponding to the ink of the similar color to the color of the ink ejected by the selected nozzle exists (step S500). Here, when it is assumed that the selected nozzle is the light cyan nozzle, since the cyan nozzle exists as the similar color nozzle to the light cyan nozzle (the branch of (Yes) of step S500), the pixel value of the pixel data corresponding to the selected nozzle (light cyan nozzle) is changed based on the color ratio information such that the ink ejection amount of the light cyan ink becomes the ejection ratio capable of preventing or reducing the banding.

For example, as shown in FIG. 17, the ejection ratio of the cyan ink of the pixel data corresponding to the abnormal nozzles including the selected nozzle in the CMYK image data is 75%, and the ejection ratio of the cyan ink 75% is divided by the color division such that the cyan nozzle takes charge of 30% and the light cyan nozzle takes charge of 45%. In the present embodiment, the light cyan ink 20% is ejected with respect to the cyan ink 10%, so that the concentration of the cyan ink can become the concentration of the light cyan ink. That is, the concentration of the light cyan and the concentration of the cyan are in accordance with the proportional relationship of 1:2. Therefore, as shown in FIG. 17, after the color division, the ejection ratio of the cyan ink becomes 30%, and the light cyan ink takes charge of the remaining ejection ratio of the cyan ink 45%. As a result, the ejection ratio of the light cyan ink becomes 45%×2=90%.

In the meantime, as described above, since the selected nozzle (light cyan nozzle) is the nozzle related to the banding, the color ratio changing unit 11a changes the pixel value of the pixel data of the abnormal nozzles including the selected nozzle based on the color ratio information such that the ejection ratio of the light cyan ink 90% becomes the ejection ratio 40% capable of preventing or reducing the banding, as shown in FIG. 17 (step S504). In the present embodiment, the color ratio information includes a maximum ejection ratio corresponding to each of CMYK in the first embodiment and a maximum ejection ratio corresponding to each of the LC and the LM. In the present embodiment, the ejection ratio of the light cyan ink is reduced to 40%, so that the banding can be prevented from occurring or reduced.

In addition, the color ratio changing unit 11a compensates for the reduced ejection amount so as to become the same color range by changing the pixel value of the pixel data corresponding to the cyan ink nozzle corresponding to the abnormal nozzles including the selected nozzle such that when the ejection amount of the light cyan ink corresponding to the selected nozzle is reduced from 90% to 40%, that is, 50% is reduced, the ejection amount of the cyan ink is increased from 30% to 55%, that is, 25% (50%/2) is increased as shown in FIG. 17 (step S506). That is, the reduced amount of the light cyan ink is compensated by increasing the ink ejection amount of the cyan ink such that the original color composed of the plurality of colors including the abnormal nozzles before the ejection ratio of the light cyan ink is within a range of the same color.

In addition, if the cyan and the light cyan have the same dot size in representing the same concentration in accordance with the proportional relationship, the number of formed dots (printing ratio) in the light cyan is twice as much as the number of formed dots in the cyan. Therefore, since the granularity may be deteriorated in order to substitute the light cyan with the cyan by 50% in the color ratio changing process, the combination with another color is taken, so that the deterioration of the granularity may be alleviated (the branch of (Yes) of step S508). In the present embodiment, as shown in FIG. 17, the ejection ratio 10% of the cyan ink is distributed with the ejection ratio of the nozzle corresponding to another color having lower concentration than the cyan ink, so that the reduction of the number of the dots is alleviated.

In addition, in the above-mentioned example, the case has been described in which the light cyan ink nozzle is related to the banding, but when the cyan ink nozzle is related to the banding, in the opposite manner as the case of the light cyan, the ejection ratio of the cyan ink is reduced to the ratio capable of preventing or reducing the banding, and the reduced amount is compensated by increasing the ejection amount of the light cyan ink. In this case, the number of formed dots by the light cyan ink may excessively increase or the state in which the light cyan concentration is not sufficient may generated. However, in this case, in order to resolve the above-mentioned problems, the combination with another color is made and the ink ejection ratio of another color is changed.

In addition, with respect to the magenta and the light magenta, the color ratio changing process can be performed with the same principle as the above-mentioned cyan and light cyan.

Further, in the above-mentioned example, finally, the ejection ratio of the light cyan ink becomes 40%, but when the ink ejection ratio of the light cyan nozzle related to the banding can be reduced to the ratio not more than 25%, in the same manner as the first embodiment, even though the printing resolution of the light cyan nozzle is half the original resolution, the color can be formed. Therefore, the nozzle causing the banding, that is, the nozzle having an ejection failure or the light cyan nozzle causing the flying curve to occur cannot be used. In this case, in the same manner as the first embodiment, the information which instructs the nozzle not to be used (information which instructs the dot not to be formed) is added to the pixel data corresponding to the nozzle causing the banding in the light cyan nozzle module, and the information which instructs the printing resolution in the N-value conversion processing unit 12 to be reduced to half the original resolution is added to the pixel data corresponding to the abnormal nozzle.

The above-mentioned determination process is performed with respect to all the nozzles in all the nozzle modules in the printing head 200, and with respect to the nozzles having been determined that the corresponding nozzles are related to the banding, the pixel value of the pixel data of the second CMYK image data corresponding to the abnormal nozzles including the corresponding nozzle and the nozzles related to the abnormal nozzles are changed such that the banding can be prevented or reduced and the color mixed ratio is within the same color range as the color before the change, so that the second image is created. The created second image data is transmitted to the printing data creating unit 12, and the printing data creating process is executed in the printing data creating unit 12 (step S106).

As described above, when the ink ejection ratio of the abnormal nozzle including the nozzle related to the banding is changed to the ejection amount capable of preventing or reducing the banding, the amount of the ejection ratio reduced by the change can be compensated by changing the ink ejection ratio of the nozzle corresponding to the similar color ink to the ink of the abnormal nozzle. In addition, since the combination with another color as well as the similar color can be made, the color change can be reduced by compensating for the reduced amount using the similar color. By the combination with another color, the granularity can be prevented from being deteriorated. In addition, since the selection width of the color mixed ratio becomes widen, the second image data can be created by performing the more effective color ratio changing process with respect to the banding.

In the second embodiment, the image data acquiring unit 10 corresponds to the image data acquiring unit according to any one of the first to fifth aspects, the second image data creating unit 11 corresponds to the second image data creating unit according to any one of the first to fifth aspects, the printing data creating unit 12 corresponds to the printing data creating unit according to any one of the first to fifth aspects, and the printing unit 13 corresponds to the printing unit according to the first aspect.

In the second embodiment, step S102 corresponds to the image data acquiring step according to any one of the second to seventh aspects, step S104 corresponds to the second image data creating step according to any one of the second to eighth aspects, step S106 corresponds to the printing data creating step according to any one of the second to eighth aspects, and step S110 corresponds to the printing step of the second or fourth aspect.

According to the characteristics of the first and second embodiments, the printing data can be created from the image data according to the characteristics of the printing head of an existing printing device while the existing printing device as it is, the exclusive printing head 13 does not need to be prepared, and the existing inkjet-type printer can be used as it is. In addition, if the printing unit 13 is separated from the printing device 100 according to the first and second embodiments, the performance thereof can be achieved by only the general-purpose printing instruction terminal such as a personal computer or the like (printing data creating device).

In addition, the invention can be also applied not only to the flying curve phenomenon but also to a case in which although the ink ejection direction is vertical (normal), the ink ejection position of the nozzle deviates from a normal position, and thus the formed dot becomes the same result as the flying curve phenomenon.

In addition, the printing device 100 in the first and second embodiments can be applied not only to the line-head-type inkjet printer but also to a multipass-type inkjet printer. If the printing device is the line-head-type inkjet printer, even though the flying curve phenomenon occurs, it is possible to obtain a high definition printing material with one pass without the white stripes or thick stripes being seen by the user. In addition, if the printing device is the multipass-type inkjet printer, the number of the reciprocal operations can be reduced, it is possible to achieve the high-speed printing, as compared with the related art.

Figure 18A:
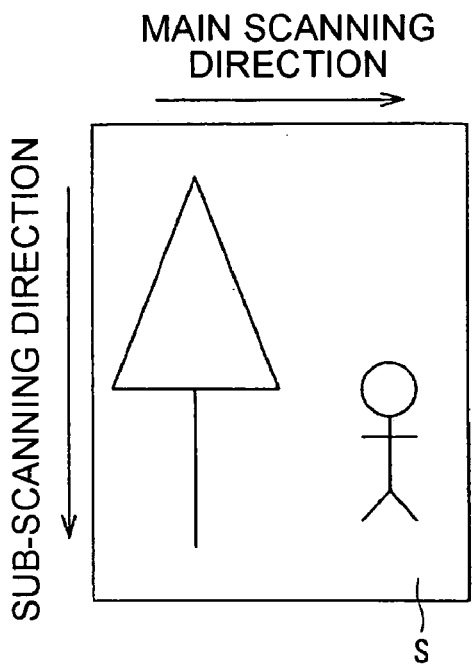
FIG. 18A is a diagram illustrating the difference between a printing mode by a multipass-type inkjet printer and a printing mode by a line head-type inkjet printer.
Figure 18B:
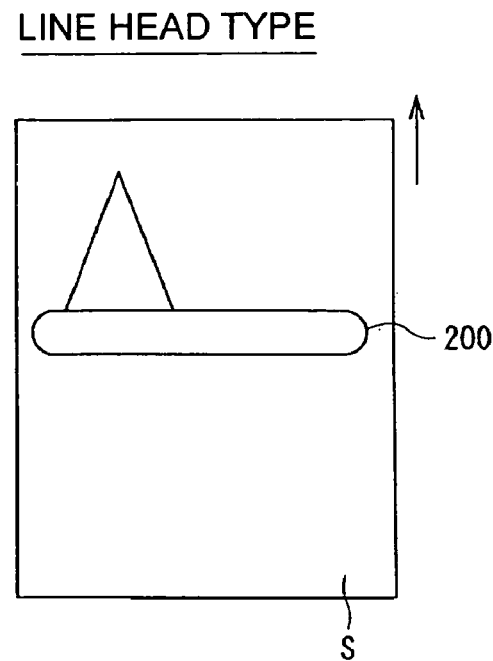
FIG. 18B is a diagram illustrating the difference between a printing mode by a multipass-type inkjet printer and a printing mode by a line head-type inkjet printer.
Figure 18C:
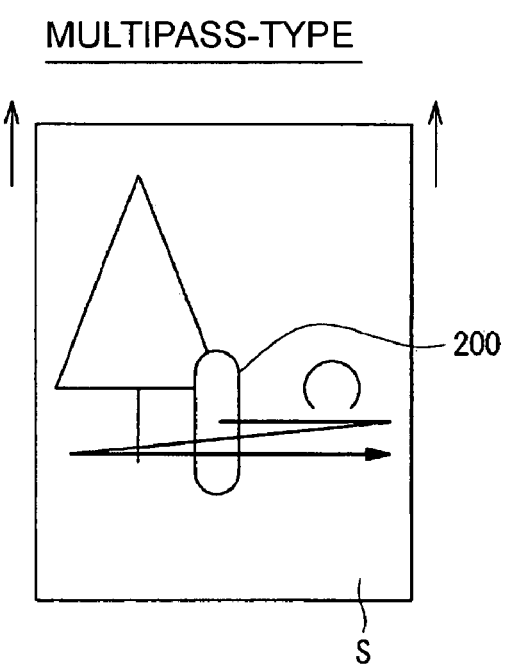
FIG. 18C is a diagram illustrating the difference between a printing mode by a multipass-type inkjet printer and a printing mode by a line head-type inkjet printer.

FIGS. 18A to 18C are diagrams illustrating printing types by the line-head-type inkjet printer and the multipass-type inkjet printer.

As shown in FIG. 18A, when the width direction of the rectangular printing paper S is set to the main scanning direction of the image data and the longitudinal direction of the rectangular printing paper S is set to the sub-scanning direction, in the line-head-type inkjet printer, as shown in FIG. 16B, the printing head 200 has a length corresponding to the paper width of the printing paper S, the printing head 200 is fixed, and the printing paper S is moved with respect to the printing head 200 in the sub-scanning direction. As a result, the printing is completed with a so-called one pass (operation). In addition, in the flat-head-type scanner, the printing paper S is fixed, the printing head 200 moves in the sub-scanning direction or the printing paper S and the printing head 200 are moved in directions opposite to each other, and the printing is performed. In the meantime, in the multi-pass-type inkjet printer, as shown in FIG. 18C, the printing head 200 having the length very smaller than the length of the paper width is positioned in the direction orthogonal to the main scanning direction, the printing paper S is moved in the sub-scanning direction at a predetermined pitch while the printing head 200 is reciprocally moved in the main scanning direction many times, and the printing is performed. Accordingly, in the case of the multipass-type inkjet printer, it takes a long printing time as compared with line-head-type inkjet printer. However, the printing head 200 can be repeatedly positioned at any location in the multipass-type inkjet printer, it is possible to reduce the white stripe phenomenon in the banding.

In addition, in the first and second embodiments, the inkjet printer has been described in which the ink is ejected in a dot type, but the invention can be applied to another printing device in which the printing mechanism is arranged in a line shape, for example, a heat transferring printer or a thermal head printer.

Figure 19:
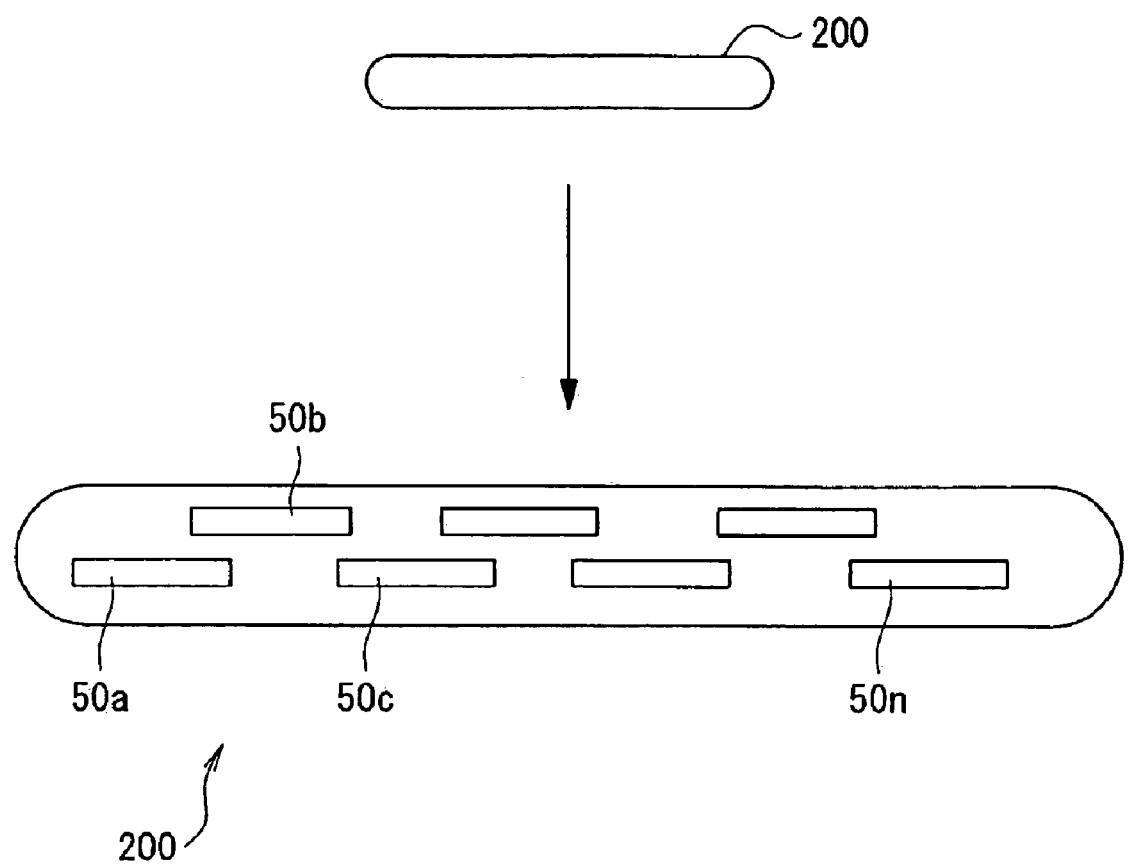
FIG. 19 is a diagram illustrating another example of a structure of a printing head.

In addition, in FIG. 3, the respective nozzle modules 50, 52, 54, and 56 provided for the respective colors of the printing head 200 have a type in which the nozzles N are continuously disposed in a linear shape in the longitudinal direction of the printing head 200, but as shown in FIG. 19, each of the nozzle modules 50, 52, 54, and 56 may be composed of a plurality of short nozzle units $50a$, $50b$, ..., and $50n$, and these may be disposed in the moving direction of the printing head 200. As such, if each of the nozzle modules 50, 52, 54, and 56 may be composed of a plurality of short nozzle units $50a$, $50b$, ..., and $50n$, since the short nozzle module can be formed by using the head in which each of nozzle units $50a$, $50b$, ..., and $50n$ is short, it is possible to improve the manufacturing yield of the nozzle module.

What is claimed is:

1. A printing device which prints a color image to be printed on a printing medium by a printing head, the printing head having a plurality of nozzles corresponding to a plurality of colors of ink for forming a dot on the printing medium, the printing device comprising:

an image data acquiring unit that acquires first image data having a plurality of pixel data;

a nozzle information storing unit that stores nozzle information capable of identifying an abnormal nozzle related to banding among the plurality of nozzles;

a second image data creating unit that creates second image data by changing a pixel value of pixel data corresponding to the abnormal nozzle related to the banding in the first image data based on the nozzle information, wherein the abnormal nozzle ejects ink of a first color;

a printing data creating unit that creates printing data by converting the second image data into dot forming pattern data corresponding to each color of a color image so as to form the color image constructed by the second image data on the recording medium, wherein the printing data creating unit employs an N-value conversion processing unit that maps a range of a gray-scale level of a selected pixel of the second image data to one of a plurality predetermined values and that selects one of a plurality of predetermined sizes for forming a dot for the selected pixel in response to that predetermined value; and a printing unit that prints the color image constructed by the second image data on the recording medium by the printing head based on the printing data, wherein the second image data creating unit changes a pixel value of pixel data corresponding to the abnormal nozzle from a first value to a second value for at least reducing the banding, wherein the first value corresponds to a first non-zero ink ejection amount and the second value corresponds to a second non-zero ink ejection amount, wherein the second ink ejection amount is smaller than the first ink ejection amount, and wherein the second image data creating unit, after changing the pixel value of the pixel data corresponding to the abnormal nozzle, changes pixel values of pixel data corresponding to a plurality of second nozzles, wherein the plurality of second nozzles each are related to the abnormal nozzle and each eject ink of a different color, wherein the plurality of second nozzles and the abnormal nozzle print a image portion having a predetermined color and corresponding to the abnormal nozzle, wherein pixel values of the pixel data corresponding to the abnormal nozzle and the plurality of second nozzles are changed such that the actual printed color of the image portion is within the same color range of the predetermined color;

wherein the printing device is a line-head-type printing device that is operable to print the color image in one pass.

2. The printing device according to claim 1,
wherein the second image data creating unit changes a pixel value of pixel data corresponding to the abnormal nozzle into a value where the ink ejection amount of the abnormal nozzle becomes smaller than the ink ejection amount before the change, changes a pixel value of pixel data corresponding to a nozzle of another color different from the color of the ink ejected by the abnormal nozzle related to the printing of the image portion of the predetermined color into a value compensating for the reduced ink ejection amount of the nozzle of another color from the ink ejection amount before the change in the abnormal nozzle, and creates second image data in which the predetermined color is within a range of the same color.

3. The printing device according to claim 1,
wherein the same color range is a range in which the color difference $\Delta E$ between an image portion before changing the pixel value and an image portion after changing the pixel value satisfies the condition ($0 \leq \Delta E \leq 0.7$) in a Lab color space.

4. The printing device according to claim 1,
wherein another color different from the color of the ink ejected by the abnormal nozzle is a color of another system different from a system of the color of the ink ejected by the abnormal nozzle.

5. The printing device according to claim 1,
wherein another color different from the color of the ink ejected by the abnormal nozzle is a color of the same system as the color of the ink ejected by the abnormal nozzle.

6. The printing device according to claim 1,
wherein the colors of the ejected ink from the plurality of second nozzles include a color of another system different from a system of the first color and a color of the same system as the first color.

7. The printing device according to claim 1,
wherein the second image data creating unit determines a changed value of a pixel value corresponding to the abnormal nozzle based on a color corresponding to the abnormal nozzle.

8. The printing device according to claim 1,
wherein the printing data creating unit creates printing data in which a dot is not formed for at least a part of pixel data corresponding to the abnormal nozzle, wherein the ink ejection amount of the abnormal nozzle is not more than a predetermined amount.

9. The printing device according to claim 1,
wherein in the printing head, the nozzles are continuously arranged over a width larger than a region where the printing medium is mounted, and
the printing head can perform printing through one scanning operation.

10. The printing device according to claim 1,
wherein the printing head performs printing while performing a reciprocal motion in a direction orthogonal to a transporting direction of the printing medium.

11. A printing data creating device which creates printing data used in a printing device which prints a color image to be printed on a printing medium by a printing head, the printing head having a plurality of nozzles corresponding to a plurality of colors of ink for forming a dot on the printing medium, the printing data creating device comprising:
 an image data acquiring unit that acquires first image data having a plurality of pixel data;
 a nozzle information storing unit that stores nozzle information capable of identifying an abnormal nozzle related to banding among the plurality of nozzles;
 a second image data creating unit that creates second image data by changing a pixel value of pixel data corresponding to the abnormal nozzle related to the banding in the first image data based on the nozzle information, wherein the abnormal nozzle ejects ink of a first color; and
 a printing data creating unit that creates printing data by converting the second image data into dot forming pattern data corresponding to each color of a color image so as to form the color image constructed by the second image data on the printing medium, wherein the printing data creating unit employs an N-value conversion processing unit that maps a range of a gray-scale level of a selected pixel of the second image data to one of a plurality predetermined values and that selects one of a plurality of predetermined sizes for forming a dot for the selected pixel in response to that predetermined value;
wherein the second image data creating unit changes a pixel value of pixel data corresponding to the abnormal nozzle from a first value to a second value for at least reducing the banding, wherein the first value corresponds to a first non-zero ink ejection amount and the second value corresponds to a second non-zero ink ejection amount, wherein the second ink ejection amount is smaller than the first ink ejection amount, and
wherein the second image data creating unit, after changing the pixel value of the pixel data corresponding to the abnormal nozzle, changes pixel values of pixel data corresponding to a plurality of second nozzles, wherein the plurality of second nozzles each are related to the abnormal nozzle and each eject ink of a different color,
wherein the plurality of second nozzles and the abnormal nozzle print a image portion having a predetermined color and corresponding to the abnormal nozzle, wherein pixel values of the pixel data corresponding to the abnormal nozzle and the plurality of second nozzles are changed such that the actual printed color of the image portion is within the same color range of the predetermined color.

* * * * *